US 10,929,893 B2

(12) United States Patent
Theodore

(10) Patent No.: US 10,929,893 B2
(45) Date of Patent: Feb. 23, 2021

(54) SYSTEMS AND METHODS FOR SELECTIVELY REFRESHING ADVERTISING CONTENT

(71) Applicant: GMT Management, LLC, Greensboro, NC (US)

(72) Inventor: George Michael Theodore, Greensboro, NC (US)

(73) Assignee: AdMetricsPro IP LLC, St. Petersburg, FL (US)

( * ) Notice: Subject to any disclaimer, the term of this patent is extended or adjusted under 35 U.S.C. 154(b) by 298 days.

(21) Appl. No.: 15/900,466

(22) Filed: Feb. 20, 2018

(65) Prior Publication Data

US 2019/0130454 A1  May 2, 2019

Related U.S. Application Data

(63) Continuation-in-part of application No. 15/801,183, filed on Nov. 1, 2017.

(51) Int. Cl.
G06Q 30/02 (2012.01)

(52) U.S. Cl.
CPC ..... *G06Q 30/0272* (2013.01); *G06Q 30/0275* (2013.01); *G06Q 30/0277* (2013.01)

(58) Field of Classification Search
CPC ........... G06Q 30/0277; G06Q 30/0241; G06Q 30/0246; G06Q 30/0252; G06Q 30/0243;
(Continued)

(56) References Cited

U.S. PATENT DOCUMENTS

| 6,275,854 B1* | 8/2001 | Himmel | G06F 11/3419 |
| | | | 705/14.68 |
| 2007/0179853 A1* | 8/2007 | Feige | G06Q 30/02 |
| | | | 705/14.27 |

(Continued)

FOREIGN PATENT DOCUMENTS

| WO | WO 2015024003 | * | 2/2015 |
| WO | WO 20170197000 | * | 10/2017 |

OTHER PUBLICATIONS

Index Exchange, 5 Questions to Ask When Considering Server Side Header Bidding, Mar. 2017, 1-15 (Year: 2017).*

(Continued)

*Primary Examiner* — Kiersten V Summers
(74) *Attorney, Agent, or Firm* — Michael F. Krieger; Kirton McConkie

(57) ABSTRACT

Website publishers maximize revenue by refreshing advertisements displayed on webpages from time to time, while ensuring that only advertisements that are sufficiently visible to the consumer are refreshed. Advertisers are guaranteed that their advertisements are sufficiently visible, and are more willing to bid for placement of refreshed advertisements. A webpage is provided with an advertisement. Time that has passed since the webpage was provided is measured, but before the time that has passed since the webpage was provided has equaled or exceeded a time period at which to refresh the advertisement, it is detected that the advertisement is either not visible or is insufficiently visible on a browser providing the webpage. Accordingly, measurement of the time that has passed since the webpage was provided is suspended, such that the advertisement is not refreshed while the advertisement is either not visible or is insufficiently visible.

11 Claims, 10 Drawing Sheets

(58) Field of Classification Search
CPC ........... G06Q 30/0272; G06Q 30/0244; G06Q 30/0273; G06Q 30/0275; G06Q 30/0264
USPC ............. 705/14.73, 14.4, 14.41, 14.45, 14.5, 705/14.42, 14.38, 14.43, 14.69, 14.71, 705/14.61, 14.68

See application file for complete search history.

(56) References Cited

U.S. PATENT DOCUMENTS

| | | | | |
|---|---|---|---|---|
| 2008/0066107 | A1* | 3/2008 | Moonka | G11B 27/11 725/42 |
| 2011/0082755 | A1* | 4/2011 | Itzhak | G06Q 30/02 705/14.69 |
| 2012/0109746 | A1* | 5/2012 | Dyor | G06F 21/6227 705/14.49 |
| 2015/0019350 | A1* | 1/2015 | Grant | G06Q 30/0275 705/14.71 |
| 2015/0051986 | A1* | 2/2015 | Saifee | G06Q 30/0277 705/14.71 |
| 2015/0154631 | A1* | 6/2015 | Umeda | G06Q 30/0243 705/14.42 |
| 2017/0061468 | A1* | 3/2017 | You | H04W 4/21 |
| 2017/0104875 | A1* | 4/2017 | Im | H04M 3/5191 |
| 2017/0180464 | A1* | 6/2017 | Isbister | H04L 67/10 |
| 2017/0330245 | A1* | 11/2017 | Guermas | G06Q 30/0275 |
| 2020/0019983 | A1* | 1/2020 | Johnston, Jr. | G06Q 30/0275 |

OTHER PUBLICATIONS

Gu Marina, Client-Side or Server Side? A Dalse Dichotomy, Oct. 18, 2017, 1-4 (Year: 2017).*
Ad Ops Insider, Guide to Header Bidding Wrappers, Oct. 25, 2016, Internet Archive WayBack Machine, 1-14 (Year: 2016).*
Siefo, Header Bidding Wrappers Are the Next Ad-Tech Craze (for Large Publishers), Aug. 24, 2016 (Year: 2016).*
Getintent, Header Bidding: Disruptive Innocation Most Publishers Welcome, Feb. 3, 2017, 1-7 (Year: 2017).*
Sovm's Publisher Advocate, Sovm's Definitive Guide to Header Bidding, Feb. 7, 2016, 1-12 (Year: 2016).*
Trademark Electronic Search System (TESS), APPNEXUS, Jan. 13, 2020, United States Patent and Trademark Office (Year: 2020).*
Trademark Electronic Search System (TESS), GOOGLE, Jan. 13, 2020, United States Patent and Trademark Office (Year: 2020).*
Trademark Electronic Search System (TESS), JAVASCRIPT, Jan. 14, 2020, United States Patent and Trademark Office (Year: 2020).*
Trademark Electronic Search System (TESS), OATH, Jan. 13, 2020, United States Patent and Trademark Office (Year: 2020).*
Trademark Electronic Search System (TESS), OPENX, Jan. 13, 2020, United States Patent and Trademark Office (Year: 2020).*
PubMatic, Unwrapping Wrapper Technology: How Does Your Wrapper Stack Up? Nov. 28, 2017, 1-5 (Year: 2017).*
Pike Lexie, What is a Header Bidder Wrapper and How Does it Work? Mar. 21, 2017, SpotX, 1-3 (Year: 2017).*
Benes Ross, WTF are Wrapper Tags?, Dec. 7, 2016, DIGIDAY, 1-3 (Year: 2016).*
PubMatic Header Bidding Wrappers: 6 Questions Publishers Need to Ask Post date of Aug. 31, 2017 (Year: 2017).*
PubMatic Q3 2017 Quarterly Mobile Index Report Shows Header Bidding Gaining Worldwide Adoption 2 Dec. 2017 (Year: 2017).*

* cited by examiner

SYSTEMS AND METHODS FOR SELECTIVELY REFRESHING ADVERTISING CONTENT

CROSS-REFERENCE TO RELATED APPLICATIONS

This application is a continuation-in-part of prior application Ser. No. 15/801,183 filed Nov. 1, 2017, which is incorporated herein by reference for all it discloses.

BACKGROUND OF THE INVENTION

1. Field of the Invention

The present invention relates to generating revenue through ad placement on websites, and more particularly to systems and methods for improving advertising revenue on websites by refreshing advertisements displayed on a website only when the advertisements are visible.

2. Background and Related Art

Publishers of web content often seek to monetize their content by serving ads typically provided by third-party advertisers with their web content. Advertisers pay the publisher for the number of impressions (times the advertisement is displayed once on the webpage) for the ad. There are several manners in which most sites monetize their traffic. Some publishers and/or sites serve ads without using an ad server. These publishers/sites may either use a single ad agency, or they may hard code the page to use an ad server such as GOOGLE's AdSense program to automatically provide ads for the publisher/site. While this system provides some revenue to the publisher, there is no competition for the publisher's impressions, and as a result the publisher realizes a lower revenue rate than might otherwise be possible.

Other methods rely on an auction process to increase competition and revenue. There are several main methods in which website advertising space is put up for selective auction by website publishers. The first method is known as the waterfall method or daisy chaining method. This method often utilizes systems such as GOOGLE's DoubleClick for Publishers (DFP) free ad server with AdSense. The second method is known as header bidding. This method often utilizes systems such as GOOGLE's DoubleClick for Publishers free ad server with AdExchange features and controls.

In the traditional waterfall or daisy chaining method, a ladder of networks, exchanges, or supply-side platforms (SSPs) are set up in order of preference or performance to the publisher, typically based on the past record of yield of each network/exchange/SSP (revenue per thousand impressions, otherwise known as revenue per mille, or RPM, related to cost per mille or CPM). When a page is loaded and an impression becomes available, the impression is redirected to each network until the impression is sold. The theory is that as the impression moves down the waterfall, the RMP decreases, but because lower networks have less access to the best inventory to bid on, the impression will be sold at the best price available.

Unfortunately, if no one wants to purchase the impression at a floor price set up by the publisher, the impression is returned to a fallback ad server such as GOOGLE AdSense, or an in-house ad is run in the impression. This system provides complete control with approximately ten to fifteen percent loss rate of ads. Typically, approximately forty percent of ads are filled by ad agencies in the waterfall, and approximately sixty percent of ads are filled by the fallback ad server (e.g. GOOGLE AdSense or the publisher's own fallback ad agencies).

Additionally, the passing around of the impression through the waterfall and then potentially back to the fallback ad server increases latency of ad loading and of the page loading overall, which worsens the browsing experience for the customer, which will eventually lessen the attractiveness of the website. The end result is reduced revenues to the website publisher. Additionally, the waterfall system essentially depends on advertisers in a set network within the waterfall being willing to purchase at the set floor price without recognizing that the same inventory could be purchased cheaper in a lower network. Furthermore, an advertiser in a lower network might be willing to outbid an advertiser in a higher network, but is never given the opportunity to do so if the impression is purchased in the higher network.

In header bidding, when a page is loaded, a header in the page causes a notification to be sent out to multiple demand sources simultaneously that the impression is up for sale. The publisher's ad server collects available bids from the multiple demand sources and determines which source put out the highest bid. The highest bidder is notified by the publisher's ad server, and sends its creative to be served on the impression purchased. The publisher determines how many demand sources to allow to bid, keeping in mind issues such as fill rate, yield, and latency. The header bidding process utilizes a JAVASCRIPT wrapper or other container or framework in the webpage's header tag. Pages using header bidding often see an uplift of twenty to fifty percent in yields over waterfall methods.

This system also provides complete control with approximately ten to fifteen percent loss rate of ads. Typically, approximately fifty five percent of ads are filled by ad agencies through the bidding process (typically at a higher revenue per impression) and forty five percent of ads are filled by the fallback ad server or the publisher's own fallback ad agencies.

Latency remains one of the primary concerns for maximizing revenue through header bidding. There is a correlation between the number of demand sources allowed to bid and page loading times. As discussed above, slow page loading times negatively impacts the user experience, reduces traffic over time, and eventually reduces yield from bidding advertisers. Some publishers have attempted to address latency issues by moving significant portions of the header bidding process to the server side of the process, wherein the browser makes a single call to the supply-side platform, and the SSP makes calls to other demand sources, collects bids, picks winners, and gets the winning ad to the available slot.

By way of example, a particular publisher might receive approximately two to four dollars RPM providing advertisements without any type of ad server (e.g. hardcoding AdSense or using a single ad agency). The same publisher might instead receive approximately three dollars to five dollars RPM using a waterfall method in light of the increased competition and better revenue rates. The same publisher might instead receive approximately five dollars to approximately seven dollars RPM using a header bidding method in light of the superior competition and revenue rates. Nevertheless, all existing methods for advertising are still hampered by failing to maximize competition and in light of the limitations imposed by the need to minimize latency.

Publishers are further limited in their ability to monetize their online content by the multitude of manners in which the content can be consumed. Online content that was once consumed almost exclusively by consumers through a browser running on a desktop or laptop computer is now also consumed by consumers on tablets and smart phones. The differing devices have screens of different sizes and the site content, including the advertising spaces, is formatted and displayed differently depending on the device and the viewable area of the device. In some instances, advertisers that would bid for impressions on a site to be displayed on a desktop or laptop are unwilling to bid for impressions on a site to be displayed on a tablet or laptop, because experience has shown that the normal advertisement will not fit in the allotted space.

While website publishers can monetize their website content by selling advertising that is provided when the webpages are loaded, additional monetization can occur by refreshing advertising from time to time. Advertisers, however, do not wish to pay for advertising that cannot be seen by the website consumer. Accordingly, revenues cannot be maximized when the website publisher cannot guarantee to the advertiser bidding on an advertising impression that the winning advertisement will actually be displayed in a location visible to the website consumer.

BRIEF SUMMARY OF THE INVENTION

Implementation of the invention provides systems and methods for increasing a number of advertisers that can place bids for an advertising impression while maintaining low latency in loading of the webpage. The systems and methods utilize a specialized control wrapper in the header to manage one or more additional wrappers so as to allow for simultaneous bid collection from multiple groups of advertisers, one group per wrapper, without experiencing the traditional increase in latency of page loading as the number of entities bidding on an impression increases.

According to certain implementations of the invention, a method provides an opportunity to advertisers to bid on advertising impressions for a webpage while maintaining a low latency. The method includes steps of providing a first wrapper as part of a header of a webpage, the first wrapper containing information relating to obtaining bids from a first subset of advertisers for a first advertising impression for the webpage, providing a second wrapper as part of the header of the webpage, the second wrapper containing information relating to obtaining bids from a second subset of advertisers for the first advertising impression for the webpage, and providing a third wrapper as part of the header of the webpage, the third wrapper containing information relating to obtaining bids from a third subset of advertisers for the first advertising impression for the webpage. The method also includes steps of providing a control wrapper as part of the header of the webpage, the control wrapper controlling synchronization among the first wrapper, the second wrapper, and the third wrapper, receiving a request to load the webpage, and in response to the request to load the webpage, using the information from the first wrapper, the second wrapper, and the third wrapper, with timing and synchronization controlled by the control wrapper, to simultaneously obtain bids for the first advertising impression for the webpage from the first subset of advertisers, the second subset of advertisers, and the third subset of advertisers.

The control wrapper may be used to cut off bidding on the first advertising impression for the webpage after a predefined period of time has passed. The control wrapper may cut off bidding before bids are received from all of the first subset of advertisers, the second subset of advertisers, or the third set of advertisers. The control wrapper may be configured to immediately terminate the bidding process of the first wrapper, the second wrapper, and the third wrapper for the first advertising impression when bids are received from all of the first subset of advertisers, the second subset of advertisers, and the third subset of advertisers.

The method may further include steps of determining a highest bid for each subset of advertisers for the first advertising impression among all bids received from the first subset of advertisers, the second subset of advertisers, and the third subset of advertisers and passing the highest bid for each subset of advertisers for the first advertising impression to an ad exchange partner to permit the ad exchange partner to exceed a highest overall bid. The highest bid for each wrapper and for each ad unit on that page load may be passed to the ad exchange partner (e.g. GOOGLE's AdExchange), and the ad exchange partner must beat the highest bid amount across all wrappers as well as a highest line item on a current waterfall.

The method may further include steps of determining a first subset highest bid for the first advertising impression among all bids received from the first subset of advertisers, determining a second subset highest bid for the first advertising impression among all bids received from the second subset of advertisers, determining a third subset highest bid for the first advertising impression among all bids received from the third subset of advertisers, and passing the first subset highest bid, the second subset highest bid, and the third subset highest bid for the first advertising impression to an ad exchange partner to permit the ad exchange partner to exceed the first subset highest bid, the second subset highest bid, and the third subset highest bid.

The method may further include notifying a winning bidder of success in bidding for the first advertising impression and serving an advertisement of the winning bidder in the first advertising impression with the webpage. The control wrapper may include information relating to a refresh period for the first advertising impression, wherein the control wrapper causes a refresh of the bidding process and delivery of a refreshed advertisement after a predetermined time period. The predetermined time period for the refresh of the bidding process and delivery of the refreshed advertisement may be modified based considerations such as a date of the year, a refresh period set by a winning advertiser, or demand for the webpage on which the first advertising impression is placed.

The first wrapper, the second wrapper, and the third wrapper may include information defining a size of the first advertising impression and information predetermined for each advertiser of the first subset of advertisers, the second subset of advertisers, and the third subset of advertisers to inform each advertiser of the first subset of advertisers, the second subset of advertisers, and the third subset of advertisers of the size of the first advertising impression and a placement of the first advertising impression within the webpage. The method may further include a step of automatically notifying the first subset of advertisers, the second subset of advertisers, and the third subset of advertisers of an of a different advertisement size according to a device on which the advertisement is to be displayed.

The control wrapper may be one of the first wrapper, the second wrapper, or the third wrapper.

According to further implementations of the invention, the method of providing an opportunity for advertisers to on advertising impressions may be concurrently performed with respect to a plurality of available advertising impressions in addition to the first advertising impression, up to as many advertising impressions are available on the webpage.

The method may also include steps of receiving a request to load the webpage, upon receiving the request to load the webpage, setting up any necessary bid protocols to obtain bids from the first subset of advertisers, the second subset of advertisers, and the third subset of advertisers, setting up a prebid engine adapted to send out bids to the advertisers, and sending a call to prime an ad exchange partner to be prepared to receive bids from the prebid engine. The method may also include steps of detecting a type of device requesting to load the webpage, loading a relevant portion of an ad unit array based on the type of device requesting to load the webpage, and using the prebid engine and the relevant portion of the ad unit array to obtain bids from at least a portion of the first subset of advertisers, at least a portion of the second subset of advertisers, and at least a portion of the third subset of advertisers.

According to additional implementations of the invention, a method provides for multiplying a number of advertisers able to bid on advertising impressions for a webpage while maintaining a low latency. The method includes steps of providing a first wrapper as part of a header of a webpage, the first wrapper containing information relating to obtaining bids from a first subset of advertisers for a first advertising impression for the webpage, providing a second wrapper as part of the header of the webpage, the second wrapper containing information relating to obtaining bids from a second subset of advertisers for the first advertising impression for the webpage, and providing a control wrapper as part of the header of the webpage, the control wrapper containing information relating to obtaining bids from a third subset of advertisers for the first advertising impression for the webpage, and the control wrapper controlling synchronization among the first wrapper, the second wrapper, and the control wrapper. The method also includes steps of receiving a request to load the webpage and, in response to the request to load the webpage, using the information from the first wrapper, the second wrapper, and the control wrapper, with timing and synchronization controlled by the control wrapper, to simultaneously obtain bids for the first advertising impression for the webpage from the first subset of advertisers, the second subset of advertisers, and the third subset of advertisers.

The method may further include steps of determining a highest bid for each subset of advertisers for the first advertising impression among all bids received from the first subset of advertisers, the second subset of advertisers, and the third subset of advertisers and passing the highest bid for each subset of advertisers for the first advertising impression to an ad exchange partner to permit the ad exchange partner to exceed a highest overall bid.

The method may further include steps of determining a first subset highest bid for the first advertising impression among all bids received from the first subset of advertisers, determining a second subset highest bid for the first advertising impression among all bids received from the second subset of advertisers, determining a third subset highest bid for the first advertising impression among all bids received from the third subset of advertisers, and passing the first subset highest bid, the second subset highest bid, and the third subset highest bid for the first advertising impression to an ad exchange partner to permit the ad exchange partner to exceed the first subset highest bid, the second subset highest bid, and the third subset highest bid.

The method may further include passing the first advertising impression to a static waterfall to capture any static bids exceeding a highest bid among the highest bid among all bids received from the first subset of advertisers, the second subset of advertisers, and the third subset of advertisers, and a highest bid received from the ad exchange partner. The first wrapper, the second wrapper, and the control wrapper may include information defining a size of the first advertising impression and information predetermined for each advertiser of the first subset of advertisers, the second subset of advertisers, and the third subset of advertisers to inform each advertiser of the first subset of advertisers, the second subset of advertisers, and the third subset of advertisers of the size of the first advertising impression and a placement of the first advertising impression within the webpage.

The first wrapper, the second wrapper, and the control wrapper may include varying sets of information predetermined for each advertiser defining differing sizes of the first advertising impression depending on a resolution of a recipient device browsing to the webpage.

According to further implementations of the invention, the method of providing an opportunity for advertisers to on advertising impressions may be concurrently performed with respect to a plurality of available advertising impressions in addition to the first advertising impression, up to as many advertising impressions are available on the webpage.

The method may also include steps of receiving a request to load the webpage, upon receiving the request to load the webpage, setting up any necessary bid protocols to obtain bids from the first subset of advertisers, the second subset of advertisers, and the third subset of advertisers, setting up a prebid engine adapted to send out bids to the advertisers, and sending a call to prime an ad exchange partner to be prepared to receive bids from the prebid engine. The method may also include steps of detecting a type of device requesting to load the webpage, loading a relevant portion of an ad unit array based on the type of device requesting to load the webpage, and using the prebid engine and the relevant portion of the ad unit array to obtain bids from at least a portion of the first subset of advertisers, at least a portion of the second subset of advertisers, and at least a portion of the third subset of advertisers.

According to further implementations of the invention, a non-transitory computer-readable medium stores computer program code configured to cause a computing device to implement a method for multiplying a number of advertisers able to bid on advertising impressions for a webpage while maintaining a low latency. The method includes steps of providing a first wrapper as part of a header of a webpage, the first wrapper containing information relating to obtaining bids from a first subset of advertisers for a first advertising impression for the webpage, providing a second wrapper as part of the header of the webpage, the second wrapper containing information relating to obtaining bids from a second subset of advertisers for the first advertising impression for the webpage, and providing a control wrapper as part of the header of the webpage, the control wrapper containing information relating to obtaining bids from a third subset of advertisers for the first advertising impression for the webpage, and the control wrapper controlling synchronization among the first wrapper, the second wrapper, and the control wrapper. The method also includes steps of receiving a request to load the webpage, and in response to the request to load the webpage, using the information from the first wrapper, the second wrapper, and the control wrapper, with timing and synchronization controlled by the control wrapper, to simultaneously obtain bids for the first advertising impression for the webpage from the first subset of advertisers, the second subset of advertisers, and the third subset of advertisers.

The method may also include steps of receiving a request to load the webpage, upon receiving the request to load the webpage, setting up any necessary bid protocols to obtain bids from the first subset of advertisers, the second subset of advertisers, and the third subset of advertisers, setting up a prebid engine adapted to send out bids to the advertisers, and sending a call to prime an ad exchange partner to be prepared to receive bids from the prebid engine. The method may also include steps of detecting a type of device requesting to load the webpage, loading a relevant portion of an ad unit array based on the type of device requesting to load the webpage, and using the prebid engine and the relevant portion of the ad unit array to obtain bids from at least a portion of the first subset of advertisers, at least a portion of the second subset of advertisers, and at least a portion of the third subset of advertisers.

According to further implementations of the invention, the method of providing an opportunity for advertisers to on advertising impressions may be concurrently performed with respect to a plurality of available advertising impressions in addition to the first advertising impression, up to as many advertising impressions are available on the webpage.

While implementations of the invention have been summarized with respect to bidding on a single advertising impression or advertising unit on a given webpage, the methods described above may be repeated simultaneously with respect to each advertising impression or ad unit on that page load. In other words, each wrapper may contain code language to permit a similar coordinated multi-wrapper header bidding process to occur simultaneously through each subset of advertisers for each ad unit.

Further implementations of the invention provide opportunities for website publishers to maximize revenue by refreshing advertisements displayed on webpages from time to time, and the publisher is able to ensure that only advertisements that are sufficiently visible to the consumer are refreshed. Accordingly, because advertisers are guaranteed that their advertisements are sufficiently visible, they will be more willing to bid for placement of refreshed advertisements. According to implementations of the invention, a method increases webpage advertising revenue by ensuring that an advertising impression is visible on a webpage displayed on a user's browser before soliciting bids for a refreshed advertisement on the webpage. The method includes steps of providing a webpage with an advertisement therein, the webpage including information relating to a time period at which to refresh the advertisement with a new advertisement, measuring a time that has passed since the webpage was provided, before the time that has passed since the webpage was provided has equaled or exceeded the time period at which to refresh the advertisement, detecting that the advertisement is either not visible or is insufficiently visible on a browser providing the webpage, and suspending measurement of the time that has passed since the webpage was provided, such that the advertisement is not refreshed while the advertisement is either not visible or is insufficiently visible.

The method may also include detecting that the advertisement is either visible or is sufficiently visible on the browser providing the webpage and resuming measurement of the time that has passed since the webpage was provided. The method may also include determining that the time that has passed since the webpage was provided has equaled or exceeded the time period at which to refresh the advertisement and refreshing the advertisement with a new advertisement.

The method may further include steps of measuring a time that has passed since an original advertisement was refreshed with a new advertisement, before the time that has passed since the original advertisement was refreshed with a new advertisement has equaled or exceeded the time period at which to refresh the advertisement, detecting that the new advertisement is either not visible or is insufficiently visible on the browser providing the webpage, suspending measurement of the time that has passed since the original advertisement was refreshed with a new advertisement, such that the new advertisement is not refreshed while the new advertisement is either not visible or is insufficiently visible, detecting that the new advertisement is either visible or is sufficiently visible on the browser providing the webpage, resuming measurement of the time that has passed since the original advertisement was refreshed with the new advertisement, determining that the time that has passed since the original advertisement was refreshed with the new advertisement has equaled or exceeded the time period at which to refresh the advertisement, and refreshing the new advertisement with another new advertisement.

Refreshing the advertisement with a new advertisement may include obtaining bids from an increased number of advertisers while maintaining low latency, including providing a first wrapper as part of a header of the webpage, the first wrapper containing information relating to obtaining bids from a first subset of advertisers for a first advertising impression for the webpage, providing a second wrapper as part of the header of the webpage, the second wrapper containing information relating to obtaining bids from a second subset of advertisers for the first advertising impression for the webpage, providing a third wrapper as part of the header of the webpage, the third wrapper containing information relating to obtaining bids from a third subset of advertisers for the first advertising impression for the webpage, and providing a control wrapper as part of the header of the webpage, the control wrapper controlling synchronization among the first wrapper, the second wrapper, and the third wrapper. Refreshing the advertisement may further include receiving a request to refresh the advertisement and in response to the request to refresh the advertisement, using the information from the first wrapper, the second wrapper, and the third wrapper, with timing and synchronization controlled by the control wrapper, to simultaneously obtain bids for the first advertising impression for the webpage from the first subset of advertisers, the second subset of advertisers, and the third subset of advertisers.

Detecting that the advertisement is either not visible or is insufficiently visible may entail detecting that a browser window displaying the webpage has been minimized or obscured. Alternatively or additionally, detecting that the advertisement is either not visible or is insufficiently visible may entail detecting that a cutoff percentage of the advertisement falls outside of a visible content area of a browser window displaying the webpage, the cutoff percentage being a predetermined percentage selected within a range of ten percent to ninety percent. In some instances, measurement of the time that has passed since the webpage was provided is resumed when at least fifty-one percent of the advertisement falls within the visible content area.

In some implementations, the advertisement is a first advertisement of the webpage, and the webpage includes one or more additional advertisements. In such implementations, the method may further include steps of measuring the time that has passed since the webpage was provided for each of the one or more additional advertisements, before the time that has passed since the webpage was provided for one of the one or more additional websites has equaled or exceeded the time period at which to refresh the advertisement, detecting that the one or more additional advertisements is either not visible or is insufficiently visible on a browser providing the webpage, and suspending measurement of the time that has passed since the webpage was provided with respect to the one or more additional advertisements, such that the one or more advertisement is not refreshed while the advertisement is either not visible or is insufficiently visible. Measurement of the time that has passed since the webpage was provided, suspension of measurement of the time that has passed since the webpage was provided, resumption of measurement of the time that has passed since the webpage was provided, and refreshing of the advertisement may occur independently for each advertisement of the webpage.

According to further implementations of the invention, a method for increasing webpage advertising revenue by ensuring that advertising impressions are visible on a webpage displayed on a user's browser before soliciting bids for refreshed advertisements on the webpage includes steps of providing a webpage with a plurality of advertisements therein, the webpage including information relating to one or more time periods at which to refresh the plurality of advertisements with new advertisements, measuring a time that has passed since the webpage was provided, before the time that has passed since the webpage was provided has equaled or exceeded the one or more time periods at which to refresh the advertisements, detecting that one or more of the plurality of advertisements is either not visible or is insufficiently visible on a browser providing the webpage, and suspending measurement of the time that has passed since the webpage was provided with respect to the one or more advertisements that is either not visible or is insufficiently visible, such that the one or more advertisements that is either not visible or is insufficiently visible is not refreshed while the one or more advertisements is either not visible or is insufficiently visible.

The method may further include detecting that the one or more advertisements that was either not visible or was insufficiently visible is either visible or is sufficiently visible on the browser providing the webpage and resuming measurement of the time that has passed since the webpage was provided with respect to the one or more advertisements. The method may also include steps of determining that the time that has passed since the webpage was provided has equaled or exceeded one or more of the one or more time periods at which to refresh the one or more advertisement and for each advertisement that has had its time period at which to refresh the one or more advertisements equaled or exceeded by the time that has passed since the webpage was provided, refreshing the advertisement with a new advertisement.

Refreshing the advertisement with a new advertisement may entail obtaining bids from an increased number of advertisers while maintaining low latency, including steps of providing a first wrapper as part of a header of the webpage, the first wrapper containing information relating to obtaining bids from a first subset of advertisers for a first advertising impression for the webpage, providing a second wrapper as part of the header of the webpage, the second wrapper containing information relating to obtaining bids from a second subset of advertisers for the first advertising impression for the webpage, providing a third wrapper as part of the header of the webpage, the third wrapper containing information relating to obtaining bids from a third subset of advertisers for the first advertising impression for the webpage, providing a control wrapper as part of the header of the webpage, the control wrapper controlling synchronization among the first wrapper, the second wrapper, and the third wrapper, receiving a request to refresh the advertisement, and in response to the request to refresh the advertisement, using the information from the first wrapper, the second wrapper, and the third wrapper, with timing and synchronization controlled by the control wrapper, to simultaneously obtain bids for the first advertising impression for the webpage from the first subset of advertisers, the second subset of advertisers, and the third subset of advertisers.

Detecting that one or more of the plurality of advertisements is either not visible or is insufficiently visible may entail either detecting that a browser window displaying the webpage has been minimized or obscured or detecting that a cutoff percentage of the advertisement falls outside of a visible content area of a browser window displaying the webpage, the cutoff percentage being a predetermined percentage selected within a range of ten percent to ninety percent.

According to still further implementations of the invention, a non-transitory computer-readable medium stores computer program code configured to cause a computing device to implement a method for increasing webpage advertising revenue by ensuring that an advertising impression is visible on a webpage displayed on a user's browser before soliciting bids for a refreshed advertisement on the webpage. The method includes steps of providing a webpage with an advertisement therein, the webpage including information relating to a time period at which to refresh the advertisement with a new advertisement, measuring a time that has passed since the webpage was provided, before the time that has passed since the webpage was provided has equaled or exceeded the time period at which to refresh the advertisement, detecting that the advertisement is either not visible or is insufficiently visible on a browser providing the webpage, and suspending measurement of the time that has passed since the webpage was provided, such that the advertisement is not refreshed while the advertisement is either not visible or is insufficiently visible.

The method may also include detecting that the advertisement is either visible or is sufficiently visible on the browser providing the webpage and resuming measurement of the time that has passed since the webpage was provided. The method may also include determining that the time that has passed since the webpage was provided has equaled or exceeded the time period at which to refresh the advertisement and refreshing the advertisement with a new advertisement.

The method may further include steps of measuring a time that has passed since an original advertisement was refreshed with a new advertisement, before the time that has passed since the original advertisement was refreshed with a new advertisement has equaled or exceeded the time period at which to refresh the advertisement, detecting that the new advertisement is either not visible or is insufficiently visible on the browser providing the webpage, suspending measurement of the time that has passed since the original advertisement was refreshed with a new advertisement, such that the new advertisement is not refreshed while the new advertisement is either not visible or is insufficiently visible, detecting that the new advertisement is either visible or is sufficiently visible on the browser providing the webpage, resuming measurement of the time that has passed since the original advertisement was refreshed with the new advertisement, determining that the time that has passed since the original advertisement was refreshed with the new advertisement has equaled or exceeded the time period at which to refresh the advertisement, and refreshing the new advertisement with another new advertisement.

Refreshing the advertisement with a new advertisement may include obtaining bids from an increased number of advertisers while maintaining low latency, including providing a first wrapper as part of a header of the webpage, the first wrapper containing information relating to obtaining bids from a first subset of advertisers for a first advertising impression for the webpage, providing a second wrapper as part of the header of the webpage, the second wrapper containing information relating to obtaining bids from a second subset of advertisers for the first advertising impression for the webpage, providing a third wrapper as part of the header of the webpage, the third wrapper containing information relating to obtaining bids from a third subset of advertisers for the first advertising impression for the webpage, and providing a control wrapper as part of the header of the webpage, the control wrapper controlling synchronization among the first wrapper, the second wrapper, and the third wrapper. Refreshing the advertisement may further include receiving a request to refresh the advertisement and in response to the request to refresh the advertisement, using the information from the first wrapper, the second wrapper, and the third wrapper, with timing and synchronization controlled by the control wrapper, to simultaneously obtain bids for the first advertising impression for the webpage from the first subset of advertisers, the second subset of advertisers, and the third subset of advertisers.

Detecting that the advertisement is either not visible or is insufficiently visible may entail detecting that a browser window displaying the webpage has been minimized or obscured. Alternatively or additionally, detecting that the advertisement is either not visible or is insufficiently visible may entail detecting that a cutoff percentage of the advertisement falls outside of a visible content area of a browser window displaying the webpage, the cutoff percentage being a predetermined percentage selected within a range of ten percent to ninety percent. In some instances, measurement of the time that has passed since the webpage was provided is resumed when at least fifty-one percent of the advertisement falls within the visible content area.

In some implementations, the advertisement is a first advertisement of the webpage, and the webpage includes one or more additional advertisements. In such implementations, the method may further include steps of measuring the time that has passed since the webpage was provided for each of the one or more additional advertisements, before the time that has passed since the webpage was provided for one of the one or more additional websites has equaled or exceeded the time period at which to refresh the advertisement, detecting that the one or more additional advertisements is either not visible or is insufficiently visible on a browser providing the webpage, and suspending measurement of the time that has passed since the webpage was provided with respect to the one or more additional advertisements, such that the one or more advertisement is not refreshed while the advertisement is either not visible or is insufficiently visible. Measurement of the time that has passed since the webpage was provided, suspension of measurement of the time that has passed since the webpage was provided, resumption of measurement of the time that has passed since the webpage was provided, and refreshing of the advertisement may occur independently for each advertisement of the webpage.

BRIEF DESCRIPTION OF THE SEVERAL VIEWS OF THE DRAWINGS

The objects and features of the present invention will become more fully apparent from the following description and appended claims, taken in conjunction with the accompanying drawings. Understanding that these drawings depict only typical embodiments of the invention and are, therefore, not to be considered limiting of its scope, the invention will be described and explained with additional specificity and detail through the use of the accompanying drawings in which:

DETAILED DESCRIPTION OF THE INVENTION

Figure 1:
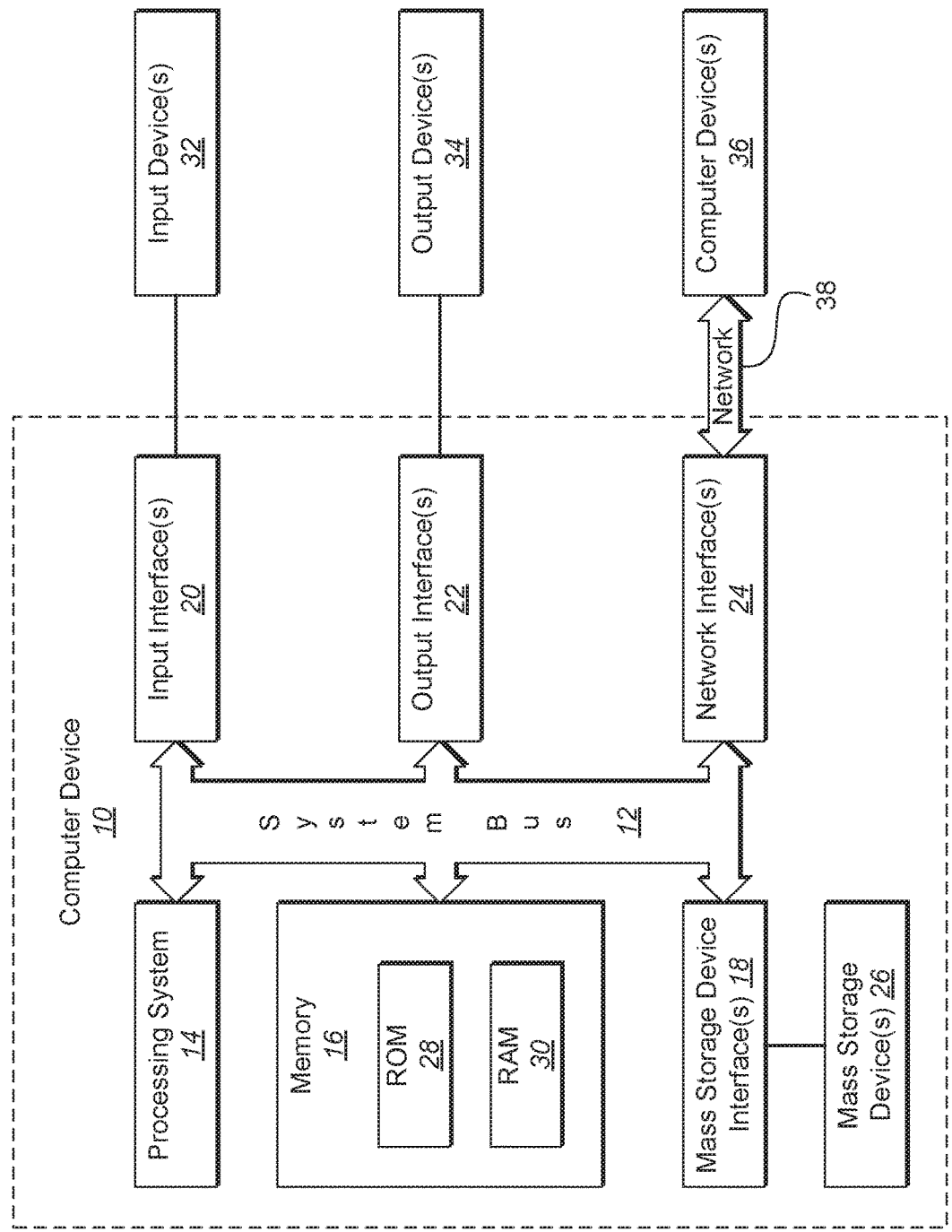
FIG. 1 shows a depiction of a representative computer system for use with embodiments of the invention.

A description of embodiments of the present invention will now be given with reference to the Figures. It is expected that the present invention may take many other forms and shapes, hence the following disclosure is intended to be illustrative and not limiting, and the scope of the invention should be determined by reference to the appended claims.

Embodiments of the invention provide systems and methods for increasing a number of advertisers that can place bids for an advertising impression while maintaining low latency in loading of the webpage. The systems and methods utilize a specialized control wrapper in the header to manage one or more additional wrappers so as to allow for simultaneous bid collection from multiple groups of advertisers, one group per wrapper, without experiencing the traditional increase in latency of page loading as the number of entities bidding on an impression increases.

According to certain embodiments of the invention, a method provides an opportunity to advertisers to bid on advertising impressions for a webpage while maintaining a low latency. The method includes steps of providing a first wrapper as part of a header of a webpage, the first wrapper containing information relating to obtaining bids from a first subset of advertisers for a first advertising impression for the webpage, providing a second wrapper as part of the header of the webpage, the second wrapper containing information relating to obtaining bids from a second subset of advertisers for the first advertising impression for the webpage, and providing a third wrapper as part of the header of the webpage, the third wrapper containing information relating to obtaining bids from a third subset of advertisers for the first advertising impression for the webpage. The method also includes steps of providing a control wrapper as part of the header of the webpage, the control wrapper controlling synchronization among the first wrapper, the second wrapper, and the third wrapper, receiving a request to load the webpage, and in response to the request to load the webpage, using the information from the first wrapper, the second wrapper, and the third wrapper, with timing and synchronization controlled by the control wrapper, to simultaneously obtain bids for the first advertising impression for the webpage from the first subset of advertisers, the second subset of advertisers, and the third subset of advertisers.

The control wrapper may be used to cut off bidding on the first advertising impression for the webpage after a pre-defined period of time has passed. The control wrapper may cut off bidding before bids are received from all of the first subset of advertisers, the second subset of advertisers, or the third set of advertisers. The control wrapper may be configured to immediately terminate the bidding process of the first wrapper, the second wrapper, and the third wrapper for the first advertising impression when bids are received from all of the first subset of advertisers, the second subset of advertisers, and the third subset of advertisers.

The method may further include steps of determining a highest bid for each subset of advertisers for the first advertising impression among all bids received from the first subset of advertisers, the second subset of advertisers, and the third subset of advertisers and passing the highest bid for each subset of advertisers for the first advertising impression to an ad exchange partner to permit the ad exchange partner to exceed a highest overall bid. The highest bid for each wrapper and for each ad unit on that page load may be passed to the ad exchange partner (e.g. GOOGLE's AdExchange, or a DoubleClick for Publishers ad server), and the ad exchange partner must beat the highest bid amount across all wrappers as well as a highest line item on a current waterfall.

The method may further include steps of determining a first subset highest bid for the first advertising impression among all bids received from the first subset of advertisers, determining a second subset highest bid for the first advertising impression among all bids received from the second subset of advertisers, determining a third subset highest bid for the first advertising impression among all bids received from the third subset of advertisers, and passing the first subset highest bid, the second subset highest bid, and the third subset highest bid for the first advertising impression to an ad exchange partner to permit the ad exchange partner to exceed the first subset highest bid, the second subset highest bid, and the third subset highest bid. The ad server then selects a highest overall bid from among the highest subset bids, the waterfall, or the ad exchange partner (e.g. GOOGLE AdExchange, etc.).

The method may further include notifying a winning bidder of success in bidding for the first advertising impression and serving an advertisement of the winning bidder in the first advertising impression with the webpage. The control wrapper may include information relating to a refresh period for the first advertising impression, wherein the control wrapper causes a refresh of the bidding process and delivery of a refreshed advertisement after a predetermined time period. The predetermined time period for the refresh of the bidding process and delivery of the refreshed advertisement may be modified based considerations such as a date of the year, a refresh period set by a winning advertiser, or demand for the webpage on which the first advertising impression is placed.

The first wrapper, the second wrapper, and the third wrapper may include information defining a size of the first advertising impression and information predetermined for each advertiser of the first subset of advertisers, the second subset of advertisers, and the third subset of advertisers to inform each advertiser of the first subset of advertisers, the second subset of advertisers, and the third subset of advertisers of the size of the first advertising impression and a placement of the first advertising impression within the webpage. The method may further include a step of automatically notifying the first subset of advertisers, the second subset of advertisers, and the third subset of advertisers of an of a different advertisement size according to a device on which the advertisement is to be displayed.

The control wrapper may be one of the first wrapper, the second wrapper, or the third wrapper.

According to further embodiments of the invention, the method of providing an opportunity for advertisers to on advertising impressions may be concurrently performed with respect to a plurality of available advertising impressions in addition to the first advertising impression, up to as many advertising impressions are available on the webpage.

The method may also include steps of receiving a request to load the webpage, upon receiving the request to load the webpage, setting up any necessary bid protocols to obtain bids from the first subset of advertisers, the second subset of advertisers, and the third subset of advertisers, setting up a prebid engine adapted to send out bids to the advertisers, and sending a call to prime an ad exchange partner to be prepared to receive bids from the prebid engine. The method may also include steps of detecting a type of device requesting to load the webpage, loading a relevant portion of an ad unit array based on the type of device requesting to load the webpage, and using the prebid engine and the relevant portion of the ad unit array to obtain bids from at least a portion of the first subset of advertisers, at least a portion of the second subset of advertisers, and at least a portion of the third subset of advertisers.

According to additional embodiments of the invention, a method provides for multiplying a number of advertisers able to bid on advertising impressions for a webpage while maintaining a low latency. The method includes steps of providing a first wrapper as part of a header of a webpage, the first wrapper containing information relating to obtaining bids from a first subset of advertisers for a first advertising impression for the webpage, providing a second wrapper as part of the header of the webpage, the second wrapper containing information relating to obtaining bids from a second subset of advertisers for the first advertising impression for the webpage, and providing a control wrapper as part of the header of the webpage, the control wrapper containing information relating to obtaining bids from a third subset of advertisers for the first advertising impression for the webpage, and the control wrapper controlling synchronization among the first wrapper, the second wrapper, and the control wrapper. The method also includes steps of receiving a request to load the webpage and, in response to the request to load the webpage, using the information from the first wrapper, the second wrapper, and the control wrapper, with timing and synchronization controlled by the control wrapper, to simultaneously obtain bids for the first advertising impression for the webpage from the first subset of advertisers, the second subset of advertisers, and the third subset of advertisers.

The method may further include steps of determining a highest bid for each subset of advertisers for the first advertising impression among all bids received from the first subset of advertisers, the second subset of advertisers, and the third subset of advertisers and passing the highest bid for each subset of advertisers for the first advertising impression to an ad exchange partner to permit the ad exchange partner to exceed a highest overall bid. The highest bid for each wrapper and for each ad unit on that page load may be passed to the ad exchange partner (e.g. GOOGLE's AdExchange, or a DoubleClick for Publishers ad server), and the ad exchange partner must beat the highest bid amount across all wrappers as well as a highest line item on a current waterfall.

The method may further include steps of determining a first subset highest bid for the first advertising impression among all bids received from the first subset of advertisers, determining a second subset highest bid for the first advertising impression among all bids received from the second subset of advertisers, determining a third subset highest bid for the first advertising impression among all bids received from the third subset of advertisers, and passing the first subset highest bid, the second subset highest bid, and the third subset highest bid for the first advertising impression to an ad exchange partner to permit the ad exchange partner to exceed the first subset highest bid, the second subset highest bid, and the third subset highest bid. The ad server then selects a highest overall bid from among the highest subset bids, the waterfall, or the ad exchange partner (e.g., GOOGLE's AdExchange, etc.).

The method may further include passing the first advertising impression to a static waterfall to capture any static bids exceeding a highest bid among the highest bid among all bids received from the first subset of advertisers, the second subset of advertisers, and the third subset of advertisers, and a highest bid received from the ad exchange partner. The first wrapper, the second wrapper, and the control wrapper may include information defining a size of the first advertising impression and information predetermined for each advertiser of the first subset of advertisers, the second subset of advertisers, and the third subset of advertisers to inform each advertiser of the first subset of advertisers, the second subset of advertisers, and the third subset of advertisers of the size of the first advertising impression and a placement of the first advertising impression within the webpage.

The first wrapper, the second wrapper, and the control wrapper may include varying sets of information predetermined for each advertiser defining differing sizes of the first advertising impression depending on a resolution of a recipient device browsing to the webpage.

According to further embodiments of the invention, the method of providing an opportunity for advertisers to on advertising impressions may be concurrently performed with respect to a plurality of available advertising impressions in addition to the first advertising impression, up to as many advertising impressions are available on the webpage.

The method may also include steps of receiving a request to load the webpage, upon receiving the request to load the webpage, setting up any necessary bid protocols to obtain bids from the first subset of advertisers, the second subset of advertisers, and the third subset of advertisers, setting up a prebid engine adapted to send out bids to the advertisers, and sending a call to prime an ad exchange partner to be prepared to receive bids from the prebid engine. The method may also include steps of detecting a type of device requesting to load the webpage, loading a relevant portion of an ad unit array based on the type of device requesting to load the webpage, and using the prebid engine and the relevant portion of the ad unit array to obtain bids from at least a portion of the first subset of advertisers, at least a portion of the second subset of advertisers, and at least a portion of the third subset of advertisers.

According to further embodiments of the invention, a non-transitory computer-readable medium stores computer program code configured to cause a computing device to implement a method for multiplying a number of advertisers able to bid on advertising impressions for a webpage while maintaining a low latency. The method includes steps of providing a first wrapper as part of a header of a webpage, the first wrapper containing information relating to obtaining bids from a first subset of advertisers for a first advertising impression for the webpage, providing a second wrapper as part of the header of the webpage, the second wrapper containing information relating to obtaining bids from a second subset of advertisers for the first advertising impression for the webpage, and providing a control wrapper as part of the header of the webpage, the control wrapper containing information relating to obtaining bids from a third subset of advertisers for the first advertising impression for the webpage, and the control wrapper controlling synchronization among the first wrapper, the second wrapper, and the control wrapper. The method also includes steps of receiving a request to load the webpage, and in response to the request to load the webpage, using the information from the first wrapper, the second wrapper, and the control wrapper, with timing and synchronization controlled by the control wrapper, to simultaneously obtain bids for the first advertising impression for the webpage from the first subset of advertisers, the second subset of advertisers, and the third subset of advertisers.

The method may also include steps of receiving a request to load the webpage, upon receiving the request to load the webpage, setting up any necessary bid protocols to obtain bids from the first subset of advertisers, the second subset of advertisers, and the third subset of advertisers, setting up a prebid engine adapted to send out bids to the advertisers, and sending a call to prime an ad exchange partner to be prepared to receive bids from the prebid engine. The method may also include steps of detecting a type of device requesting to load the webpage, loading a relevant portion of an ad unit array based on the type of device requesting to load the webpage, and using the prebid engine and the relevant portion of the ad unit array to obtain bids from at least a portion of the first subset of advertisers, at least a portion of the second subset of advertisers, and at least a portion of the third subset of advertisers.

According to further embodiments of the invention, the method of providing an opportunity for advertisers to on advertising impressions may be concurrently performed with respect to a plurality of available advertising impressions in addition to the first advertising impression, up to as many advertising impressions are available on the webpage.

While embodiments of the invention are illustrated with respect to bidding on a single advertising impression or advertising unit on a given webpage, the methods described above may be repeated simultaneously with respect to each advertising impression or ad unit on that page load. In other words, each wrapper may contain code language to permit a similar coordinated multi-wrapper header bidding process to occur simultaneously through each subset of advertisers for each ad unit.

Further embodiments of the invention provide opportunities for website publishers to maximize revenue by refreshing advertisements displayed on webpages from time to time, and the publisher is able to ensure that only advertisements that are sufficiently visible to the consumer are refreshed. Accordingly, because advertisers are guaranteed that their advertisements are sufficiently visible, they will be more willing to bid for placement of refreshed advertisements. According to embodiments of the invention, a method increases webpage advertising revenue by ensuring that an advertising impression is visible on a webpage displayed on a user's browser before soliciting bids for a refreshed advertisement on the webpage. The method includes steps of providing a webpage with an advertisement therein, the webpage including information relating to a time period at which to refresh the advertisement with a new advertisement, measuring a time that has passed since the webpage was provided, before the time that has passed since the webpage was provided has equaled or exceeded the time period at which to refresh the advertisement, detecting that the advertisement is either not visible or is insufficiently visible on a browser providing the webpage, and suspending measurement of the time that has passed since the webpage was provided, such that the advertisement is not refreshed while the advertisement is either not visible or is insufficiently visible.

The method may also include detecting that the advertisement is either visible or is sufficiently visible on the browser providing the webpage and resuming measurement of the time that has passed since the webpage was provided. The method may also include determining that the time that has passed since the webpage was provided has equaled or exceeded the time period at which to refresh the advertisement and refreshing the advertisement with a new advertisement.

The method may further include steps of measuring a time that has passed since an original advertisement was refreshed with a new advertisement, before the time that has passed since the original advertisement was refreshed with a new advertisement has equaled or exceeded the time period at which to refresh the advertisement, detecting that the new advertisement is either not visible or is insufficiently visible on the browser providing the webpage, suspending measurement of the time that has passed since the original advertisement was refreshed with a new advertisement, such that the new advertisement is not refreshed while the new advertisement is either not visible or is insufficiently visible, detecting that the new advertisement is either visible or is sufficiently visible on the browser providing the webpage, resuming measurement of the time that has passed since the original advertisement was refreshed with the new advertisement, determining that the time that has passed since the original advertisement was refreshed with the new advertisement has equaled or exceeded the time period at which to refresh the advertisement, and refreshing the new advertisement with another new advertisement.

Refreshing the advertisement with a new advertisement may include obtaining bids from an increased number of advertisers while maintaining low latency, including providing a first wrapper as part of a header of the webpage, the first wrapper containing information relating to obtaining bids from a first subset of advertisers for a first advertising impression for the webpage, providing a second wrapper as part of the header of the webpage, the second wrapper containing information relating to obtaining bids from a second subset of advertisers for the first advertising impression for the webpage, providing a third wrapper as part of the header of the webpage, the third wrapper containing information relating to obtaining bids from a third subset of advertisers for the first advertising impression for the webpage, and providing a control wrapper as part of the header of the webpage, the control wrapper controlling synchronization among the first wrapper, the second wrapper, and the third wrapper. Refreshing the advertisement may further include receiving a request to refresh the advertisement and in response to the request to refresh the advertisement, using the information from the first wrapper, the second wrapper, and the third wrapper, with timing and synchronization controlled by the control wrapper, to simultaneously obtain bids for the first advertising impression for the webpage from the first subset of advertisers, the second subset of advertisers, and the third subset of advertisers.

Detecting that the advertisement is either not visible or is insufficiently visible may entail detecting that a browser window displaying the webpage has been minimized or obscured. Alternatively or additionally, detecting that the advertisement is either not visible or is insufficiently visible may entail detecting that a cutoff percentage of the advertisement falls outside of a visible content area of a browser window displaying the webpage, the cutoff percentage being a predetermined percentage selected within a range of ten percent to ninety percent. In some instances, measurement of the time that has passed since the webpage was provided is resumed when at least fifty-one percent of the advertisement falls within the visible content area.

In some embodiments, the advertisement is a first advertisement of the webpage, and the webpage includes one or more additional advertisements. In such embodiments, the method may further include steps of measuring the time that has passed since the webpage was provided for each of the one or more additional advertisements, before the time that has passed since the webpage was provided for one of the one or more additional websites has equaled or exceeded the time period at which to refresh the advertisement, detecting that the one or more additional advertisements is either not visible or is insufficiently visible on a browser providing the webpage, and suspending measurement of the time that has passed since the webpage was provided with respect to the one or more additional advertisements, such that the one or more advertisement is not refreshed while the advertisement is either not visible or is insufficiently visible. Measurement of the time that has passed since the webpage was provided, suspension of measurement of the time that has passed since the webpage was provided, resumption of measurement of the time that has passed since the webpage was provided, and refreshing of the advertisement may occur independently for each advertisement of the webpage.

According to further embodiments of the invention, a method for increasing webpage advertising revenue by ensuring that advertising impressions are visible on a webpage displayed on a user's browser before soliciting bids for refreshed advertisements on the webpage includes steps of providing a webpage with a plurality of advertisements therein, the webpage including information relating to one or more time periods at which to refresh the plurality of advertisements with new advertisements, measuring a time that has passed since the webpage was provided, before the time that has passed since the webpage was provided has equaled or exceeded the one or more time periods at which to refresh the advertisements, detecting that one or more of the plurality of advertisements is either not visible or is insufficiently visible on a browser providing the webpage, and suspending measurement of the time that has passed since the webpage was provided with respect to the one or more advertisements that is either not visible or is insufficiently visible, such that the one or more advertisements that is either not visible or is insufficiently visible is not refreshed while the one or more advertisements is either not visible or is insufficiently visible.

The method may further include detecting that the one or more advertisements that was either not visible or was insufficiently visible is either visible or is sufficiently visible on the browser providing the webpage and resuming measurement of the time that has passed since the webpage was provided with respect to the one or more advertisements. The method may also include steps of determining that the time that has passed since the webpage was provided has equaled or exceeded one or more of the one or more time periods at which to refresh the one or more advertisement and for each advertisement that has had its time period at which to refresh the one or more advertisements equaled or exceeded by the time that has passed since the webpage was provided, refreshing the advertisement with a new advertisement.

Refreshing the advertisement with a new advertisement may entail obtaining bids from an increased number of advertisers while maintaining low latency, including steps of providing a first wrapper as part of a header of the webpage, the first wrapper containing information relating to obtaining bids from a first subset of advertisers for a first advertising impression for the webpage, providing a second wrapper as part of the header of the webpage, the second wrapper containing information relating to obtaining bids from a second subset of advertisers for the first advertising impression for the webpage, providing a third wrapper as part of the header of the webpage, the third wrapper containing information relating to obtaining bids from a third subset of advertisers for the first advertising impression for the webpage, providing a control wrapper as part of the header of the webpage, the control wrapper controlling synchronization among the first wrapper, the second wrapper, and the third wrapper, receiving a request to refresh the advertisement, and in response to the request to refresh the advertisement, using the information from the first wrapper, the second wrapper, and the third wrapper, with timing and synchronization controlled by the control wrapper, to simultaneously obtain bids for the first advertising impression for the webpage from the first subset of advertisers, the second subset of advertisers, and the third subset of advertisers.

Detecting that one or more of the plurality of advertisements is either not visible or is insufficiently visible may entail either detecting that a browser window displaying the webpage has been minimized or obscured or detecting that a cutoff percentage of the advertisement falls outside of a visible content area of a browser window displaying the webpage, the cutoff percentage being a predetermined percentage selected within a range of ten percent to ninety percent.

According to still further embodiments of the invention, a non-transitory computer-readable medium stores computer program code configured to cause a computing device to implement a method for increasing webpage advertising revenue by ensuring that an advertising impression is visible on a webpage displayed on a user's browser before soliciting bids for a refreshed advertisement on the webpage. The method includes steps of providing a webpage with an advertisement therein, the webpage including information relating to a time period at which to refresh the advertisement with a new advertisement, measuring a time that has passed since the webpage was provided, before the time that has passed since the webpage was provided has equaled or exceeded the time period at which to refresh the advertisement, detecting that the advertisement is either not visible or is insufficiently visible on a browser providing the webpage, and suspending measurement of the time that has passed since the webpage was provided, such that the advertisement is not refreshed while the advertisement is either not visible or is insufficiently visible.

The method may also include detecting that the advertisement is either visible or is sufficiently visible on the browser providing the webpage and resuming measurement of the time that has passed since the webpage was provided. The method may also include determining that the time that has passed since the webpage was provided has equaled or exceeded the time period at which to refresh the advertisement and refreshing the advertisement with a new advertisement.

The method may further include steps of measuring a time that has passed since an original advertisement was refreshed with a new advertisement, before the time that has passed since the original advertisement was refreshed with a new advertisement has equaled or exceeded the time period at which to refresh the advertisement, detecting that the new advertisement is either not visible or is insufficiently visible on the browser providing the webpage, suspending measurement of the time that has passed since the original advertisement was refreshed with a new advertisement, such that the new advertisement is not refreshed while the new advertisement is either not visible or is insufficiently visible, detecting that the new advertisement is either visible or is sufficiently visible on the browser providing the webpage, resuming measurement of the time that has passed since the original advertisement was refreshed with the new advertisement, determining that the time that has passed since the original advertisement was refreshed with the new advertisement has equaled or exceeded the time period at which to refresh the advertisement, and refreshing the new advertisement with another new advertisement.

Refreshing the advertisement with a new advertisement may include obtaining bids from an increased number of advertisers while maintaining low latency, including providing a first wrapper as part of a header of the webpage, the first wrapper containing information relating to obtaining bids from a first subset of advertisers for a first advertising impression for the webpage, providing a second wrapper as part of the header of the webpage, the second wrapper containing information relating to obtaining bids from a second subset of advertisers for the first advertising impression for the webpage, providing a third wrapper as part of the header of the webpage, the third wrapper containing information relating to obtaining bids from a third subset of advertisers for the first advertising impression for the webpage, and providing a control wrapper as part of the header of the webpage, the control wrapper controlling synchronization among the first wrapper, the second wrapper, and the third wrapper. Refreshing the advertisement may further include receiving a request to refresh the advertisement and in response to the request to refresh the advertisement, using the information from the first wrapper, the second wrapper, and the third wrapper, with timing and synchronization controlled by the control wrapper, to simultaneously obtain bids for the first advertising impression for the webpage from the first subset of advertisers, the second subset of advertisers, and the third subset of advertisers.

Detecting that the advertisement is either not visible or is insufficiently visible may entail detecting that a browser window displaying the webpage has been minimized or obscured. Alternatively or additionally, detecting that the advertisement is either not visible or is insufficiently visible may entail detecting that a cutoff percentage of the advertisement falls outside of a visible content area of a browser window displaying the webpage, the cutoff percentage being a predetermined percentage selected within a range of ten percent to ninety percent. In some instances, measurement of the time that has passed since the webpage was provided is resumed when at least fifty-one percent of the advertisement falls within the visible content area.

In some embodiments, the advertisement is a first advertisement of the webpage, and the webpage includes one or more additional advertisements. In such embodiments, the method may further include steps of measuring the time that has passed since the webpage was provided for each of the one or more additional advertisements, before the time that has passed since the webpage was provided for one of the one or more additional websites has equaled or exceeded the time period at which to refresh the advertisement, detecting that the one or more additional advertisements is either not visible or is insufficiently visible on a browser providing the webpage, and suspending measurement of the time that has passed since the webpage was provided with respect to the one or more additional advertisements, such that the one or more advertisement is not refreshed while the advertisement is either not visible or is insufficiently visible. Measurement of the time that has passed since the webpage was provided, suspension of measurement of the time that has passed since the webpage was provided, resumption of measurement of the time that has passed since the webpage was provided, and refreshing of the advertisement may occur independently for each advertisement of the webpage.

FIG. 1 and the corresponding discussion are intended to provide a general description of a suitable operating environment in which embodiments of the invention may be implemented. One skilled in the art will appreciate that embodiments of the invention may be practiced by one or more computing devices and in a variety of system configurations, including in a networked configuration. However, while the methods and processes of the present invention have proven to be particularly useful in association with a system comprising a general purpose computer, embodiments of the present invention include utilization of the methods and processes in a variety of environments, including embedded systems with general purpose processing units, digital/media signal processors (DSP/MSP), application specific integrated circuits (ASIC), stand alone electronic devices, and other such electronic environments.

Embodiments of the present invention embrace one or more computer-readable media, wherein each medium may be configured to include or includes thereon data or computer executable instructions for manipulating data. The computer executable instructions include data structures, objects, programs, routines, or other program modules that may be accessed by a processing system, such as one associated with a general-purpose computer capable of performing various different functions or one associated with a special-purpose computer capable of performing a limited number of functions. Computer executable instructions cause the processing system to perform a particular function or group of functions and are examples of program code means for implementing steps for methods disclosed herein. Furthermore, a particular sequence of the executable instructions provides an example of corresponding acts that may be used to implement such steps. Examples of computer-readable media include random-access memory ("RAM"), read-only memory ("ROM"), programmable read-only memory ("PROM"), erasable programmable read-only memory ("EPROM"), electrically erasable programmable read-only memory ("EEPROM"), compact disk read-only memory ("CD-ROM"), or any other device or component that is capable of providing data or executable instructions that may be accessed by a processing system. While embodiments of the invention embrace the use of all types of computer-readable media, certain embodiments as recited in the claims may be limited to the use of tangible, non-transitory computer-readable media, and the phrases "tangible computer-readable medium" and "non-transitory computer-readable medium" (or plural variations) used herein are intended to exclude transitory propagating signals per se.

With reference to FIG. 1, a representative system for implementing embodiments of the invention includes computer device 10, which may be a general-purpose or special-purpose computer or any of a variety of consumer electronic devices. For example, computer device 10 may be a personal computer, a notebook or laptop computer, a netbook, a personal digital assistant ("PDA") or other hand-held device, a smart phone, a tablet computer, a workstation, a minicomputer, a mainframe, a supercomputer, a multi-processor system, a network computer, a processor-based consumer electronic device, a computer device integrated into another device or vehicle, or the like.

Computer device 10 includes system bus 12, which may be configured to connect various components thereof and enables data to be exchanged between two or more components. System bus 12 may include one of a variety of bus structures including a memory bus or memory controller, a peripheral bus, or a local bus that uses any of a variety of bus architectures. Typical components connected by system bus 12 include processing system 14 and memory 16. Other components may include one or more mass storage device interfaces 18, input interfaces 20, output interfaces 22, and/or network interfaces 24, each of which will be discussed below.

Processing system 14 includes one or more processors, such as a central processor and optionally one or more other processors designed to perform a particular function or task. It is typically processing system 14 that executes the instructions provided on computer-readable media, such as on memory 16, a magnetic hard disk, a removable magnetic disk, a magnetic cassette, an optical disk, or from a communication connection, which may also be viewed as a computer-readable medium.

Memory 16 includes one or more computer-readable media that may be configured to include or includes thereon data or instructions for manipulating data, and may be accessed by processing system 14 through system bus 12. Memory 16 may include, for example, ROM 28, used to permanently store information, and/or RAM 30, used to temporarily store information. ROM 28 may include a basic input/output system ("BIOS") having one or more routines that are used to establish communication, such as during start-up of computer device 10. RAM 30 may include one or more program modules, such as one or more operating systems, application programs, and/or program data.

One or more mass storage device interfaces 18 may be used to connect one or more mass storage devices 26 to system bus 12. The mass storage devices 26 may be incorporated into or may be peripheral to computer device 10 and allow computer device 10 to retain large amounts of data.

Optionally, one or more of the mass storage devices 26 may be removable from computer device 10. Examples of mass storage devices include hard disk drives, magnetic disk drives, tape drives and optical disk drives. A mass storage device 26 may read from and/or write to a magnetic hard disk, a removable magnetic disk, a magnetic cassette, an optical disk, or another computer-readable medium. Mass storage devices 26 and their corresponding computer-readable media provide nonvolatile storage of data and/or executable instructions that may include one or more program modules such as an operating system, one or more application programs, other program modules, or program data. Such executable instructions are examples of program code means for implementing steps for methods disclosed herein.

One or more input interfaces 20 may be employed to enable a user to enter data and/or instructions to computer device 10 through one or more corresponding input devices 32. Examples of such input devices include a keyboard and alternate input devices, such as a mouse, trackball, light pen, stylus, or other pointing device, a microphone, a joystick, a game pad, a satellite dish, a scanner, a camcorder, a digital camera, and the like. Similarly, examples of input interfaces 20 that may be used to connect the input devices 32 to the system bus 12 include a serial port, a parallel port, a game port, a universal serial bus ("USB"), an integrated circuit, a firewire (IEEE 1394), or another interface. For example, in some embodiments input interface 20 includes an application specific integrated circuit (ASIC) that is designed for a particular application. In a further embodiment, the ASIC is embedded and connects existing circuit building blocks.

One or more output interfaces 22 may be employed to connect one or more corresponding output devices 34 to system bus 12. Examples of output devices include a monitor or display screen, a speaker, a printer, a multi-functional peripheral, and the like. A particular output device 34 may be integrated with or peripheral to computer device 10. Examples of output interfaces include a video adapter, an audio adapter, a parallel port, and the like.

One or more network interfaces 24 enable computer device 10 to exchange information with one or more other local or remote computer devices, illustrated as computer devices 36, via a network 38 that may include hardwired and/or wireless links. Examples of network interfaces include a network adapter for connection to a local area network ("LAN") or a modem, wireless link, or other adapter for connection to a wide area network ("WAN"), such as the Internet. The network interface 24 may be incorporated with or peripheral to computer device 10. In a networked system, accessible program modules or portions thereof may be stored in a remote memory storage device. Furthermore, in a networked system computer device 10 may participate in a distributed computing environment, where functions or tasks are performed by a plurality of networked computer devices.

Figure 2:
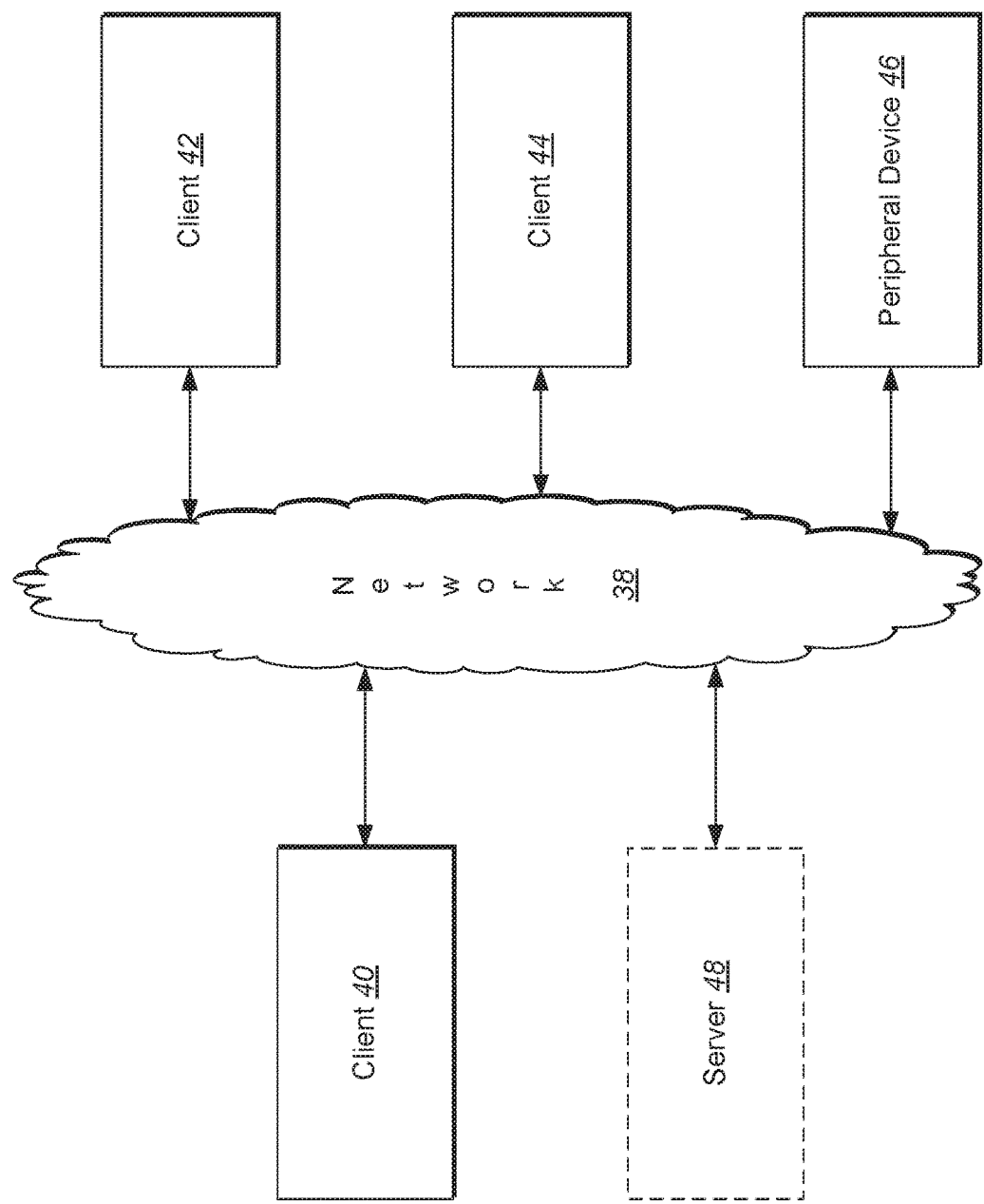
FIG. 2 shows a depiction of a representative networked computer system for use with embodiments of the invention.

Thus, while those skilled in the art will appreciate that embodiments of the present invention may be practiced in a variety of different environments with many types of system configurations, FIG. 2 provides a representative networked system configuration that may be used in association with embodiments of the present invention. The representative system of FIG. 2 includes a computer device, illustrated as client 40, which is connected to one or more other computer devices (illustrated as client 42 and client 44) and one or more peripheral devices 46 across network 38. While FIG. 2 illustrates an embodiment that includes a client 40, two additional clients, client 42 and client 44, one peripheral device 46, and optionally a server 48, which may be a print server, connected to network 38, alternative embodiments include more or fewer clients, more than one peripheral device, no peripheral devices, no server 48, and/or more than one server 48 connected to network 38. Other embodiments of the present invention include local, networked, or peer-to-peer environments where one or more computer devices may be connected to one or more local or remote peripheral devices. Moreover, embodiments in accordance with the present invention also embrace a single electronic consumer device, wireless networked environments, and/or wide area networked environments, such as the Internet.

Similarly, embodiments of the invention embrace cloud-based architectures where one or more computer functions are performed by remote computer systems and devices at the request of a local computer device. Thus, returning to FIG. 2, the client 40 may be a computer device having a limited set of hardware and/or software resources. Because the client 40 is connected to the network 38, it may be able to access hardware and/or software resources provided across the network 38 by other computer devices and resources, such as client 42, client 44, server 48, or any other resources. The client 40 may access these resources through an access program, such as a web browser, and the results of any computer functions or resources may be delivered through the access program to the user of the client 40. In such configurations, the client 40 may be any type of computer device or electronic device discussed above or known to the world of cloud computing, including traditional desktop and laptop computers, smart phones and other smart devices, tablet computers, or any other device able to provide access to remote computing resources through an access program such as a browser.

Figure 3:
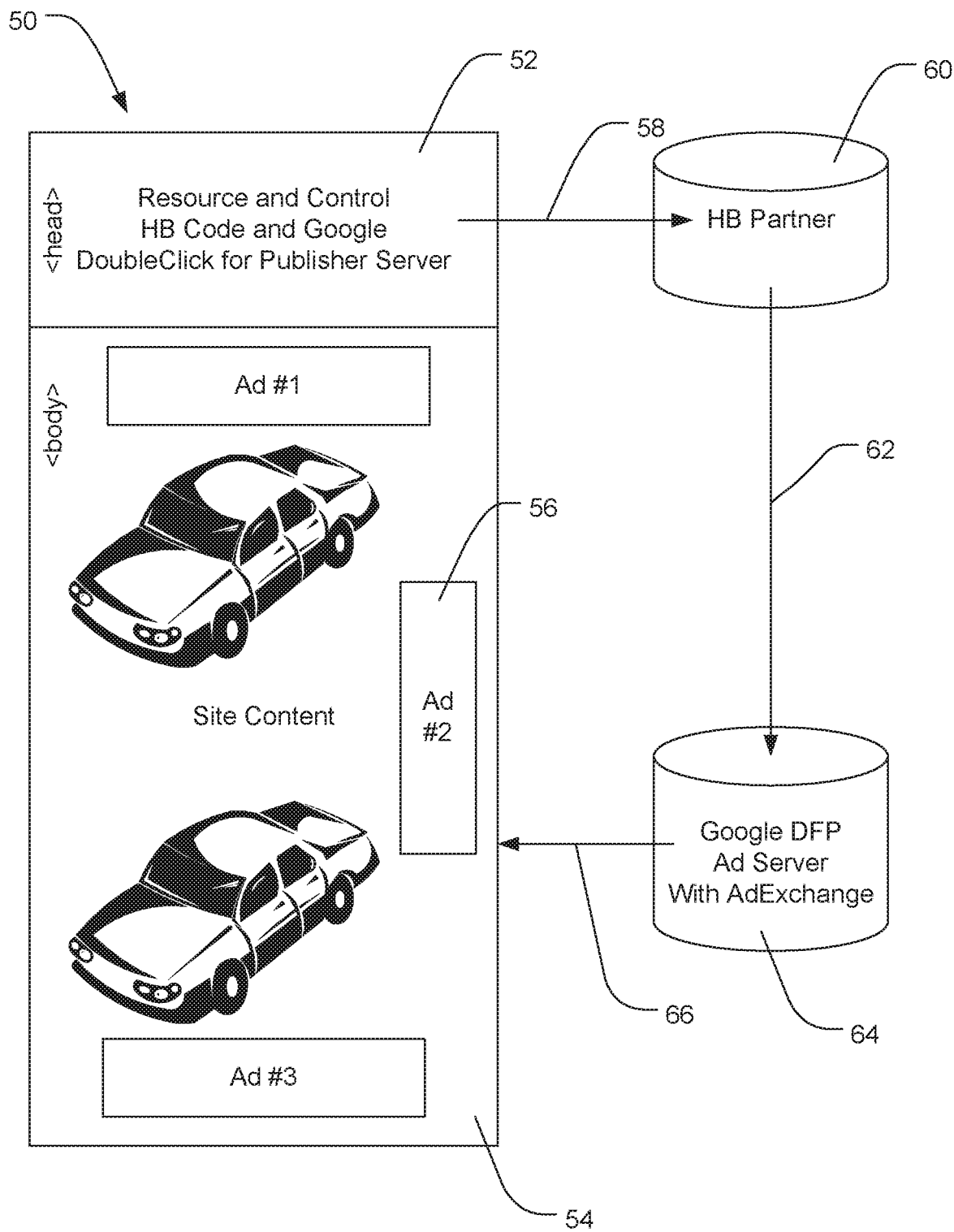
FIG. 3 shows a depiction of an exemplary header bidding process.

FIG. 3 illustrates a header bidding process for illustrating embodiments of the invention. A webpage 50 includes a header 52 and a body 54. The body 54 generally contains site content provided by a web provider that the provider wishes to monetize by selling space for display of one or more advertisements 56 that will be displayed when the webpage 50 is loaded at a consumer's computing device (e.g., desktop, laptop, tablet, and/or smartphone). The advertisements 56 can be displayed at the top of the body 54, at the bottom of the body 54, to one or both sides of the body 54, and/or inline with the site content within the body 54. The advertisements 56 can be displayed upon loading of the webpage 50, and can be refreshed from time to time while the consumer is directed to the webpage 50.

In general, the header 52 is not directly viewed by the consumer, but instead contains code to provide resources and/or control to the webpage 50 and/or the visible body 54. By way of example, the header 52 can contain code controlling a header bidding process, such as code within a wrapper of the header 52 that causes the browser, on loading the webpage 50, to initiate the auction for the one or more impressions represented by the advertisements 56 on the page, by sending bid requests 58 to a header bidding partner 60. The bid requests 58 specify or identify the page on which the advertisements 56 will be displayed, as well as information regarding the manner in which the advertisements 56 will be displayed. The system may use the Prebid.org engine or a similar engine to facilitate collection of the bids from the various advertisers.

The information regarding the manner in which the advertisements 56 will be displayed may include information regarding where on the webpage 50 the advertisements 56 will be located as well as information regarding the size of the advertisements 56. By way of example, one advertisement 56 may have a size of three hundred by two hundred fifty pixels, another advertisement 56 may have a size of seven hundred twenty-eight by ninety pixels, and another advertisement 56 may have a size of three hundred by two hundred pixels, and these sizes may be included, along with the sizes of other advertisements 56, in the information within the bid requests 58. The size information may vary depending on the kind of device on which the webpage 50 is to be displayed to account for differences in device displayable area, display orientation, and the like. For example, a smartphone may have a significantly smaller screen than does a desktop or laptop computer, or the smartphone screen may be oriented differently than a typical desktop or laptop display (e.g., a portrait orientation as opposed to a landscape orientation. Accordingly, the most effective display of the advertisements 56 may vary from application to application.

To facilitate the bidding process, the content provider may work with advertisers to pre-approve sites and advertisement sizes and/or placements to obtain unique codes for each site and ad unit that will allow the advertiser to immediately understand the type of ad being bid upon. The content provider then maintains a database, spreadsheet, matrix, or other record of all applicable codes for all advertisers, such that the codes can be included in the wrapper of the header 52 and sent with the bid requests 58 to the header bidding partner 60. Accordingly, if the code in the header 52 recognizes a different device and/or screen orientation that causes size and/or placement of one or more advertisements 56 to be varied, the code in the header 52 may cause different codes to be sent with the bid requests 58 to the header bidding partner 60. In this way, the advertisers always know exactly what they are bidding on and how it will be displayed, and can modify their bids accordingly.

The header bidding partner 60 receives bids from the various advertisers identified in the header code, and then when the bids have been received, passes the bid information at 62 to an ad server 64 (e.g., GOOGLE DoubleClick for Publishers ("DFP") with AdExchange), and the ad server 64 determines if there is an advertiser within the ad server waterfall that exceeds the highest bid received at the header bidding partner 60. If so, the ad server 64 will serve that advertisement at 66; otherwise, the ad server 64 will notify the winning bidder of the winning bid and will serve the advertisement of the bidder who placed the highest bid at the header bidding partner 60 at 66.

Figure 4:
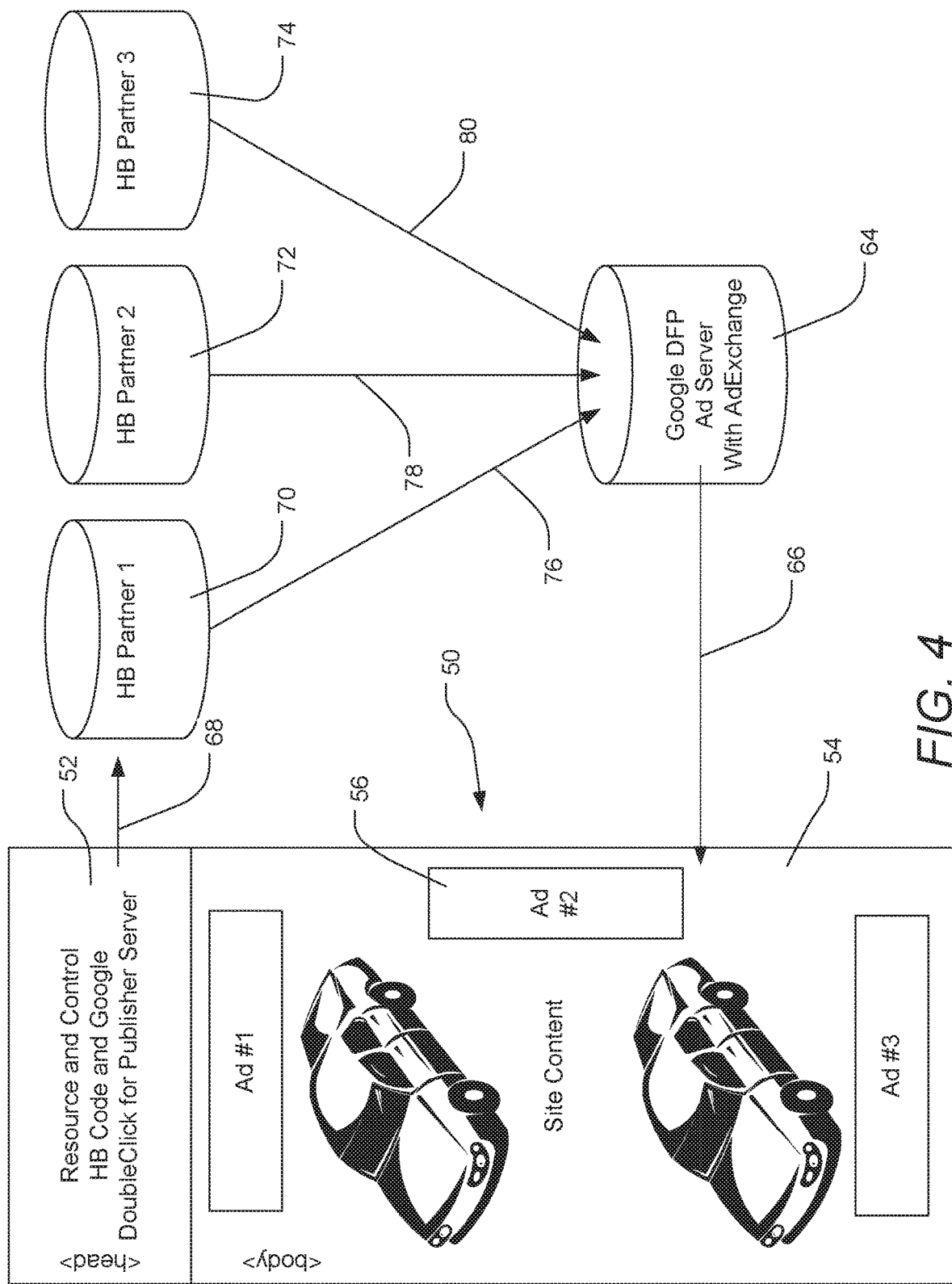
FIG. 4 shows a depiction of an alternate exemplary header bidding process.

As discussed above in the background, however, as the number of advertisers from whom bids are sought is increased, latency of loading of the webpage 50 will increase. Embodiments of the invention minimize latency increases and permit obtaining bids from an increased number of advertisers without adversely affecting latency. The manner in which this is done is illustrated in FIG. 4. The header 52 in this example is modified from the header 52 shown in FIG. 3 in that the header 52 includes a plurality of wrappers each with information regarding a subset of the advertisers from which the content provider wishes to seek bids for the advertisements 56 on the webpage 50. For example, the header 52 may include three separate wrappers, each having a manageable number (e.g., six to twelve, or any subrange or individual number within that range) of advertisers, and each wrapper being associated with a different header bidding partner. The three wrappers may each send out bid requests 68 to separately assigned header bidding partners, with a first set of the bid requests 68 going to a first header bidding partner 70, a second set of the bid requests 68 going to a second header bidding partner 72, and a third set of the bid requests 68 going to a third header bidding partner 74. By way of example, the header bidding partners 70-74 may be header bidding partners such as OPENX, APPNEXUS, and OATH.

The individual header bidding partners 70-74 each manage the set of bid requests 68 they receive, and because no header bidding partner 70-74 receives more bid requests 68 than is predetermined to avoid incurring latency issues, whatever that number may be objectively determined to be, the consumer does not experience undue latency as the bidding process is performed.

To coordinate and manage the individual header bidding partners 70-74, the header 52 includes a control wrapper that manages and controls timing and synchronization among the various wrappers. The control wrapper may be one of the wrappers with information relating to a subset of the advertisers (and accordingly corresponding to one of the header bidding partners 70-74), or the control wrapper may be a wrapper that is separate and apart from the wrappers with information relating to the subsets of advertisers and corresponding to the various header bidding partners 70-74. The control wrapper controls synchronization concerns such as timeout, refresh, and anything else that the other wrappers are doing in the header bidding process to ensure that bids are timely received and processed in a timely fashion to ensure latency is kept within acceptable levels.

The control wrapper also manages refreshing of the advertisements 56 of the website 50. The control wrapper ensures that when the time comes to refresh one or more of the advertisements 56, that the bid requests 68 are requested for each wrapper in the header 52 in a synchronized and timely fashion. In the refresh process, the control wrapper again controls issues relating to timeout or other synchronization issues. In some instances, the different advertisements 56 on the website 50 may be configured to refresh at differing intervals, or certain advertisements 56 may be configured not to refresh at all, so the control wrapper need not necessarily refresh all advertisements 56 at the same moment in time. Instead, the control wrapper may be configured to refresh different advertisements 56 on different schedules or some not at all.

In some embodiments, the website publisher may elect to vary the time at which to refresh advertisements 56 on the webpage 50 according to a variety of considerations. Typically, it is acceptable to increase the refresh rate at times of higher demand, regardless of what is driving that demand. In some instances, the demand may be due solely to a high level of interest in the content of the webpage 50, and it may be advantageous to capture additional revenue by refreshing the advertisements 56 at a higher rate when high demand periods are detected. Additionally or alternatively, expected demand for the content of the webpage 50 may be seasonal, varying with the time of the year at which the content is delivered. For example, demand for the content of some sites may be relatively low in late winter and early spring after the major holidays have passed. Accordingly, at such a low-demand period of time, it may be advantageous to avoid refreshing the advertisements 56 at all, or refreshing the advertisements 56 may be at a longer period such as every four minutes. As the year moves to later Spring and early Summer and demand increases may merit refreshing of the advertisements 56 on a schedule of approximately every three minutes. In late Summer and early Autumn, refresh rates may be increased to a schedule of approximately every two minutes. In late Autumn and approaching the holidays, refresh rates may be increased again to a schedule of approximately every minute. The changing refresh rates may be achieved by basic modification of the control wrapper only. In some instances, individual site demand may drive changes in refresh rate, such that the refresh rate of one webpage 50 may be significantly different from the refresh rate of a second webpage 50.

Modification of the refresh rate may also performed for other reasons, such as at the request of one or more advertisers. For example, an advertiser may be willing to pay a higher rate for a permanent or more-permanent advertisement. In such instances, the refresh rate for certain advertisements 56 may be slowed or completely halted to accommodate the wishes of such advertisers.

The control wrapper may also manage the process of determining the proper size and placement of advertisements 56 on the webpage 50. Accordingly, the control wrapper may be coded to detect or obtain information relating to the device receiving the website content, and can use this information to select the information sent to the header bidding partners 70-74 as part of the bid requests 68. Accordingly, the advertisers automatically know exactly what they are bidding on, regardless of formatting differences from device to device in how the webpage 50 is rendered. Thus, proper bid requests 68 are sent out to the header bidding partners regardless of varying advertisement sizes, orientations, and placements that are selected based on the viewing device constraints, all controlled by the control wrapper.

The control wrapper manages the bidding process to ensure that the bidding process and advertisement delivery process completes within the constraints of download of the webpage 50, so as to ensure increased latency issues are avoided. For example, it is common for sites having significant amounts of content to take between three and four seconds to load and for the website content to be displayed to the user. Accordingly, the control wrapper manages the bidding process to ensure completion of the bidding process and delivery of the winning advertisement 56 within this timeframe. By way of example, the control wrapper may be configured to cut off bidding at the header bidding partners 70-74 and to proceed with the remainder of the process after a predetermined period of time, such as approximately 1.5 to 1.7 seconds. Even if some bids have not been received at the header bidding partners 70-74 within the predetermined period of time, the process proceeds based on the bids that have been received with the allotted time to avoid increased page load latency. Additionally, the control wrapper may be configured to recognize when bids have been received from all identified advertisers and to proceed with the remainder of the process regardless of whether any portion of the allotted time (such as the approximately 1.5 to 1.7 seconds) to further reduce the possibility of latency. It should be understood that the allotted time to receive bids may be reduced for pages that load more quickly than the times listed herein.

When the control wrapper determines that the bidding process is complete at the various header bidding partners 70-74, the highest bid may be determined either overall, or, as illustrated in FIG. 4, for each individual channel (each header bidding partner 170-174), and information regarding the highest bid(s) received at the first header bidding partner 70 can be passed at 76 to the ad server 64 (e.g., GOOGLE DFP with AdExchange) while information regarding the highest bid(s) received at the second header bidding partner 72 can be concurrently passed at 78 to the ad server 64 and while information regarding the highest bid(s) received at the third header bidding partner 74 can be concurrently passed at 80 to the ad server 64. In this way, the ad server 64 receives three channels worth of bids from advertisers, typically from differing advertising networks, all within the time that might normally be allotted to receive bid information from a single channel using prior methods.

As may be appreciated, the receipt of bids from additional channels maximizes the revenue that may be received from monetizing the advertising space within a webpage. Accordingly, the multi-channel bidding process, in addition to generally avoiding issues of latency associated with scaling up the number of advertisers reached through a single header bidding partner 60, has been tested to provide revenue increases of between several hundred to approximately one thousand percent. Additionally, it has been found that the amount of advertising impressions falling to the static waterfall and/or being served by the fallback of the ad server 64 has been nearly eliminated, falling from approximately fifty percent of traffic to approximately fifteen percent of traffic. In some instances, the amount of traffic falling to the static waterfall or the fallback of the ad server 64 can be used as an indicator for setting the refresh rate of the advertisements 56 shown on the webpage 50.

A result of the increased revenue rates captured in this manner is that a reduced number of advertising impressions are captured by service providers such as GOOGLE's DFP with AdExchange, and the associated waterfall system, because the incoming bids generally, though not always, exceed the rates set by the service providers. Even when an advertiser on the waterfall is able to exceed the highest bid received, the process still maximizes revenue because otherwise the advertiser on the waterfall would obtain the impression at a rate that just exceeded the lower rate obtained from the traditional single-channel bidding process.

While FIG. 4 illustrates three channels of bidding, header bidding partner 70, header bidding partner 72, and header bidding partner 74, embodiments of the invention embrace the use of two channels of bidding or of more than three channels of bidding. Accordingly, FIG. 4 should only be understood as being illustrative, not restrictive of the scope of the invention.

After the ad server 64 determines the overall winning bid among the various high bids received from the header bidding partners 70-74 and its own advertisers/waterfall, notifies the appropriate advertiser, and serves the advertisement 56 as discussed above.

The control wrapper can be configured to facilitate additional time savings to further minimize the possibility of increased latency. Accordingly, in some embodiments of the invention, the control wrapper causes the browser to set up any necessary bid protocols (e.g., the OPENX protocol and the District M protocol), and any associated communication channels with the header bidding partners 70-74. The control wrapper may then set up a Prebid.org engine to handle the bid request processes with the header bidding partners 70-74. The control wrapper then notifies the ad server 64, e.g., GOOGLE Tag Services, calling it into the browser to be ready to execute, but with instructions to wait before doing anything.

Accordingly, embodiments of the invention permit website publishers to perform a header bidding process that obtains bids from an increased number of advertisers without adversely affecting page loading latency, thereby protecting the user experience while maximizing revenue for the website publisher. By way of example, the control wrapper may be configured to connect to one or two large demand sources, such as APPNEXUS and OATH. The second wrapper may be configured to connect to one or two other large demand sources, such as OPENX, and the third wrapper may be configured to connect to one or two other large demand sources, such as District M's DMX exchange. Each connected demand source may have thousands of buying agencies. Additionally, each wrapper may have direct relationships with large agencies and plug directly into demand without going through external exchanges, thereby potentially improving the overall price achieved. All this is achieved without increasing latency because the different wrappers work in parallel to receive bids.

As mentioned previously, embodiments of the invention may facilitate refreshing of advertisements 56 displayed on the webpage 50. As advertisements 56 are refreshed on the webpage 50, revenue for the publisher is increased, as new advertisers are provided opportunities to purchase impressions on the webpage 50. While advertisers appreciate the opportunity to purchase advertising impressions, advertisers do not wish to spend money acquiring advertising impressions if their advertisements are not actually viewable by webpage visitors. Accordingly, embodiments of the invention include systems and methods that provide a mechanism to ensure that advertisements 56 are only refreshed via the header bidding process when the advertisements 56 are visible on the webpage 50.

In embodiments of the invention, the ad refresh (and header bidding) process is suspended, for example, when the browsing user opens or navigates to a new/different tab within the browser, such that the webpage 50 on which the advertisements 56 are normally displayed is no longer visible, the system may detect that fact, such as by receiving information from the browser or an API running on the webpage on the browser indicating that the webpage is not visible. A similar notification may be provided to the website publisher when the browser is minimized, behind another window, or otherwise not visible to the user. In any such instance, the ad refresh process may be suspended for all advertisements 56 on the webpage 50.

Figure 5:
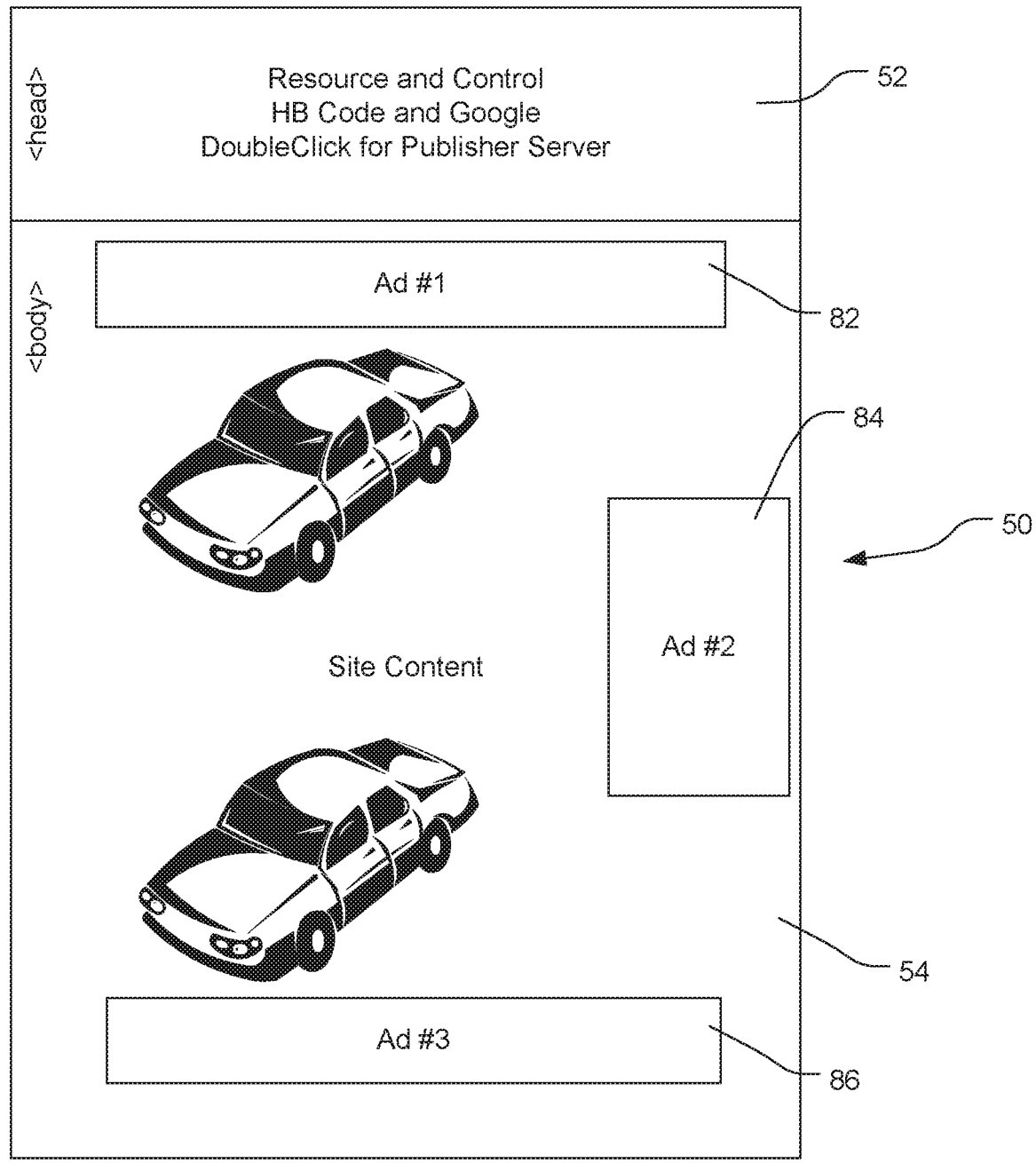
FIG. 5 shows a depiction of content of a representative webpage.

For example, FIG. 5 illustrates a webpage 50 having three advertisements 56, a first advertisement 82, a second advertisement 84, and a third advertisement 86, along with certain site content, all displayed in the body 54 of the webpage 50. Each of the first advertisement 82, the second advertisement 84, and the third advertisement 86 may be configured by wrappers in the header 52 to be refreshed on a certain set schedule, which schedule may be the same for all of the advertisements 56 or which may vary among the first advertisement 82, the second advertisement 84, and the third advertisement 86.

Figure 6:
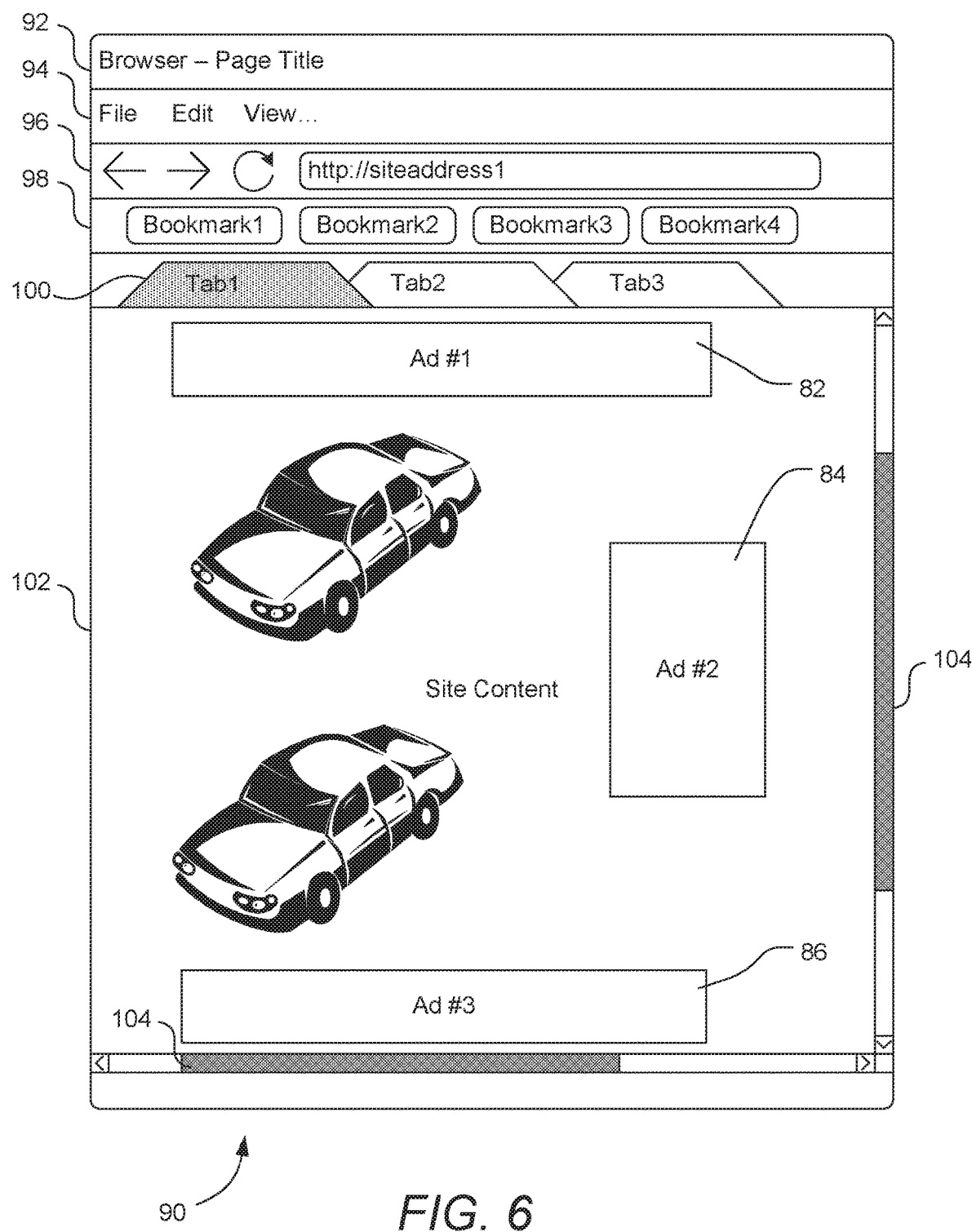
FIG. 6 shows a depiction of the webpage of FIG. 5 as it might be displayed in a representative browser window.

FIG. 6 illustrates how the webpage 50 and its content and advertisements 56 might appear in a typical browser window 90. The browser window 90 as illustrated in FIG. 6 includes a title bar 92, a file toolbar 94, a navigation toolbar 96, and a bookmark toolbar 98, which all serve to provide information to the user and/or facilitate consumption of web content using the browser, as is known in the art. The browser window also includes a number of tabs 100 (in this case three), allowing the user to have multiple webpages 50 open simultaneously and to navigate between pages by selecting the appropriate tab 100. When a webpage 50 open within one of the tabs 100 has content that extends beyond a visible content area 102 of the browser window 90, the browser window may display one or more scroll bars 104 to permit the user to scroll to view additional portions of the content of the webpage 50, as is known in the art.

Figure 7:
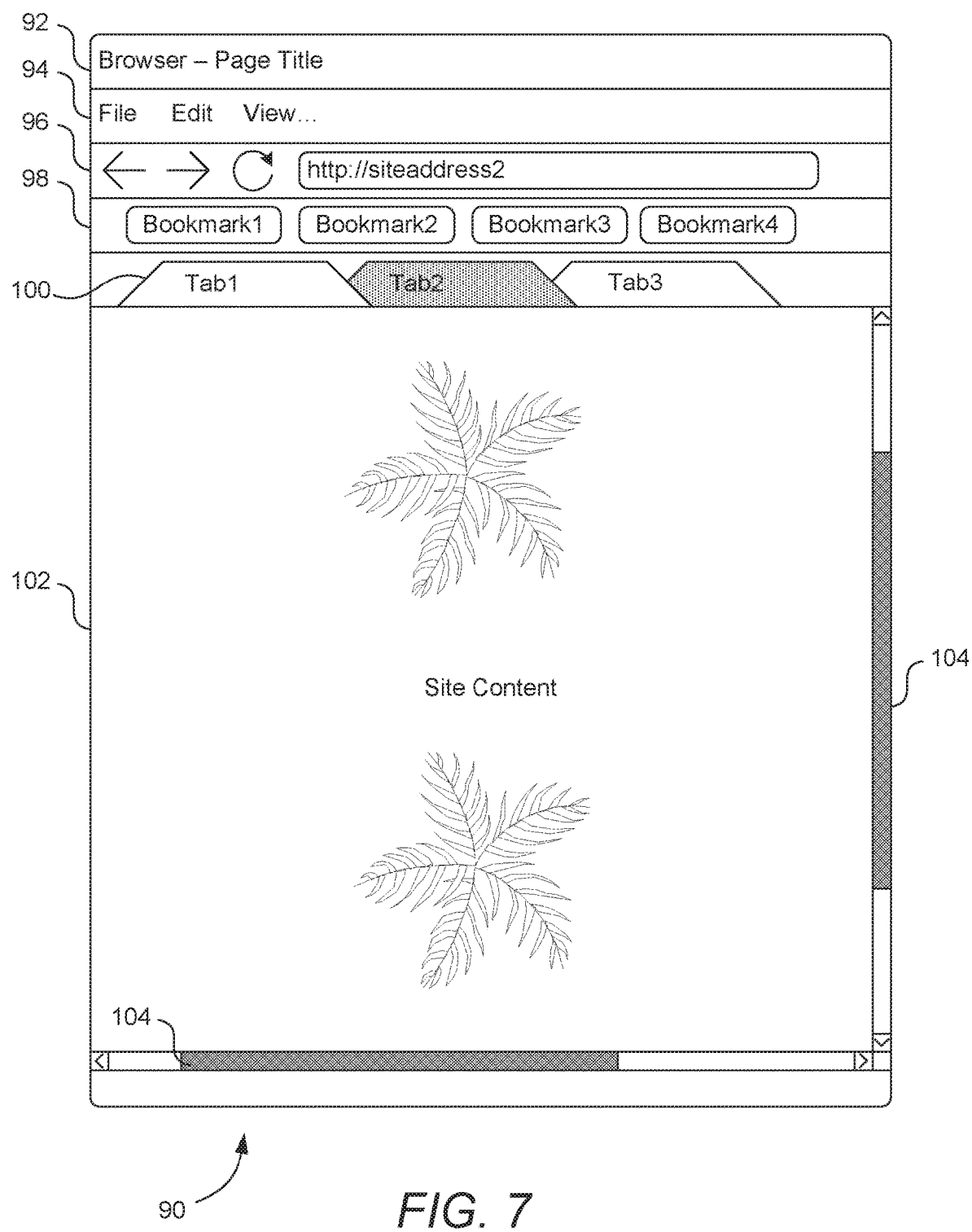
FIG. 7 shows a depiction of a browser window in which a tab displaying a webpage other than the webpage of FIG. 5 has been selected by the browser user.

In FIG. 6, the webpage 50 having the first advertisement 82, the second advertisement 84, and the third advertisement 86 is displayed on a first tab 100 (Tab 1) of the browser window 50, and all of the advertisements 56 are visible. Accordingly, each of the advertisements 56 will refresh according to the information contained in the wrappers of the header 52, and the publisher is able to further monetize the webpage 50 accordingly. If, however, the user of the browser selects a different tab, such as the second tab 100 (Tab 2), the display of the browser will change as shown in FIG. 7. In FIG. 7, the webpage 50 having the first advertisement 82, the second advertisement 84, and the third advertisement 86 is no longer being actively displayed because a different webpage 50 is loaded in the second tab 100, and the content of that webpage 50 is being displayed instead.

Because the webpage 50 having the first advertisement 82, the second advertisement 84, and the third advertisement 86 is no longer visible, the publisher may wish to suspend refreshing the advertisements 56 so that advertisers are confident that the advertising impressions they are bidding on will at least be visible to the visitor of the webpage 50. Accordingly, because the publisher can reassure the bidding advertisers that their winning advertisements will be visible to the consumer, the publisher will receive increased interest, increased bidding among advertisers, and increased advertising revenue for the website content.

Accordingly, when the browser window 90 is displaying a page other than the webpage 50 on which the advertisements 56 are displayed (as in FIG. 7), the browser or a program loaded on the webpage 50, such as an application programming interface (API) can notify the system that the webpage 50 is not visible, and accordingly, the system and/or the wrappers of the header 52 may suspend the refresh process for the displayed advertisements 56. When the user of the browser window again selects the tab 100 on which the applicable webpage 50 is displayed, the system and/or the wrappers of the header 52 may reactivate the refresh process, and any of the first advertisement 82, the second advertisement 84, and the third advertisement 86 (or any number of advertisement 56) may either be immediately refreshed or may be refreshed on a resumed schedule that was suspended when the webpage 50 was not visible.

Similarly, if the browser window 90 is minimized or behind another program window such that the webpage 50 is not visible, even when the tab 100 of the webpage 50 with the advertisements 56 is the selected tab 100, the wrappers of the header 52, a dedicated API, and/or the system may detect such a state and may suspend the refresh process for the advertisements 56. When the browser window 90 is again selected and maximized or otherwise made visible again such that the webpage 50 and its advertisements 56 are again visible, the refresh process may be activated again, and the advertisements 56 may be refreshed immediately or upon a resumed schedule.

While FIGS. 6 and 7 have been discussed in the context of visibility of an entire webpage 50 and suspending and resuming an advertisement refresh process with respect to all advertisements 56 of the webpage 50, embodiments of the invention are not limited solely to such examples. Specifically, embodiments of the invention embrace selective refreshing of only some advertisements 56 of a webpage 50 when they are at least partially visible and suspending a refresh process for other advertisements 56 when they are either not visible or not sufficiently visible on the webpage 50 as displayed in the visible content area 102 of the browser window 90. In some embodiments, a refresh process with respect to a certain advertisement 56 will be suspended when less than 51% of the advertisement 56 is visible in the visible content area 102. In other embodiments, a refresh process with respect to a certain advertisement 56 will be suspended when a portion less than some other selected percentage, which can be any selected percentage between 10% and 90% of the advertisement 56, is visible in the visible content area 102.

Figure 8:
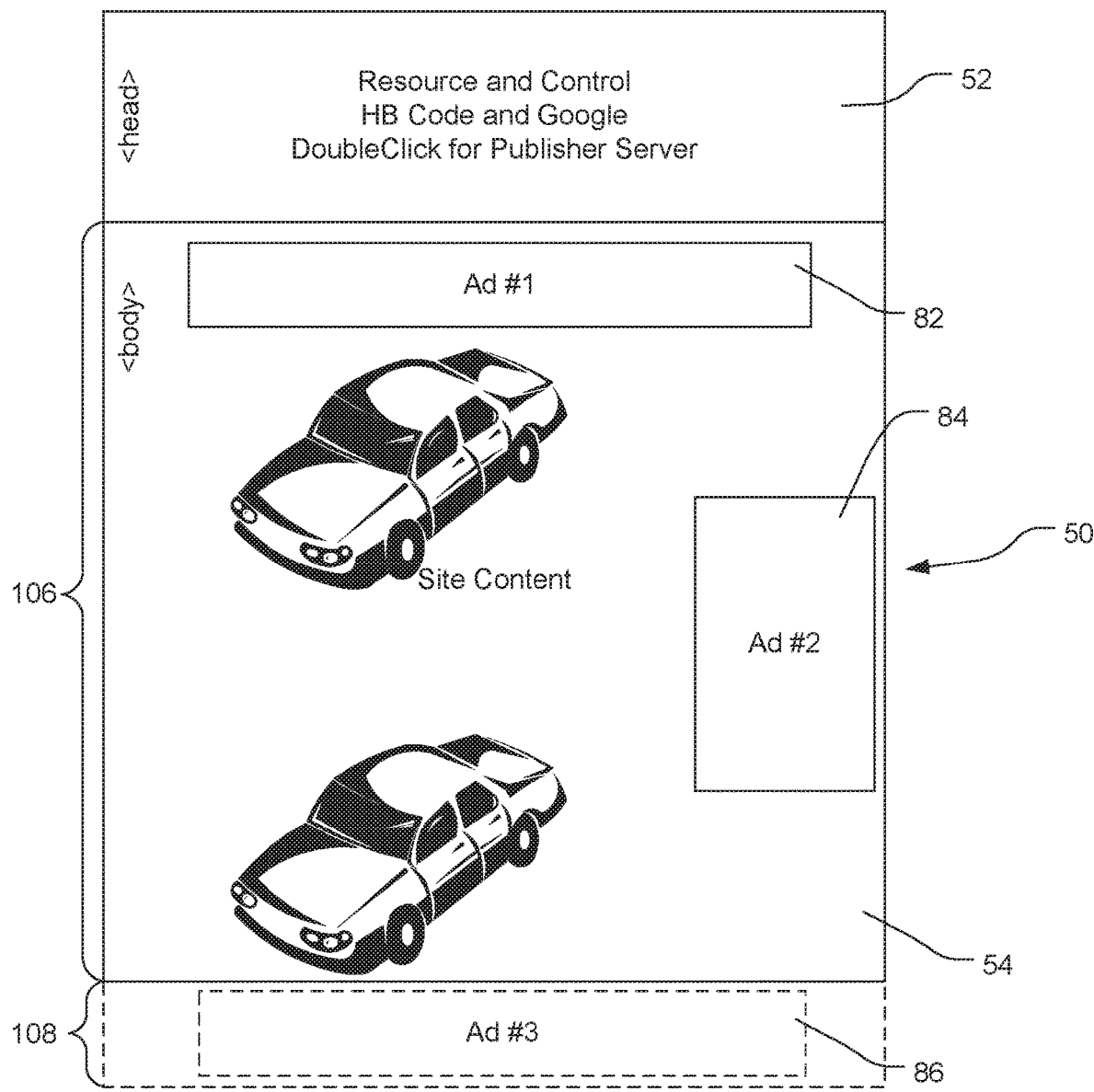
FIG. 8 shows a depiction of the webpage of FIG. 5 in which only a first portion of the webpage is visible within a visible content area of a browser window.
Figure 9:
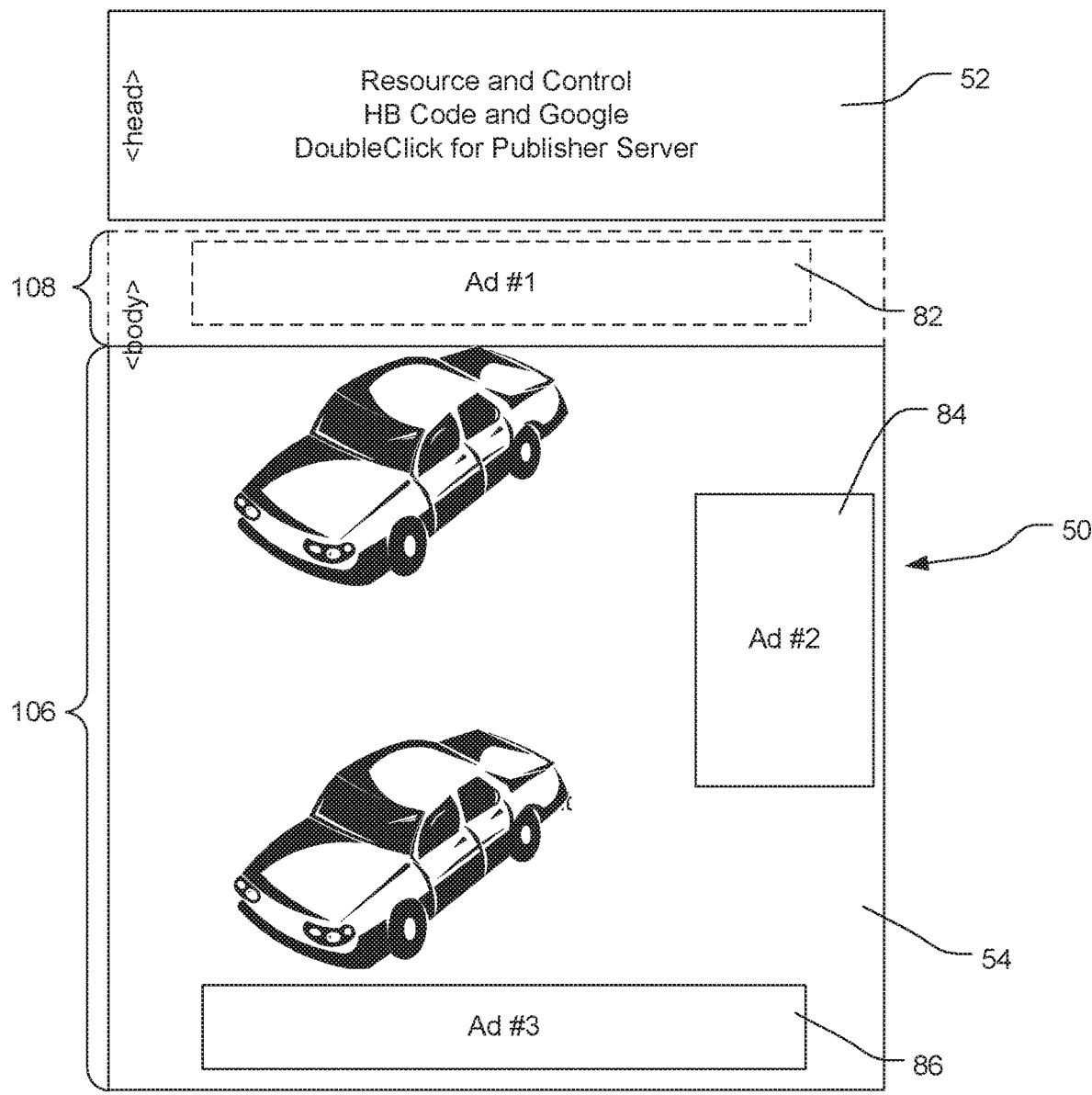
FIG. 9 shows a depiction of the webpage of FIG. 5 in which only a second portion of the webpage is visible within a visible content area of a browser window.
Figure 10:
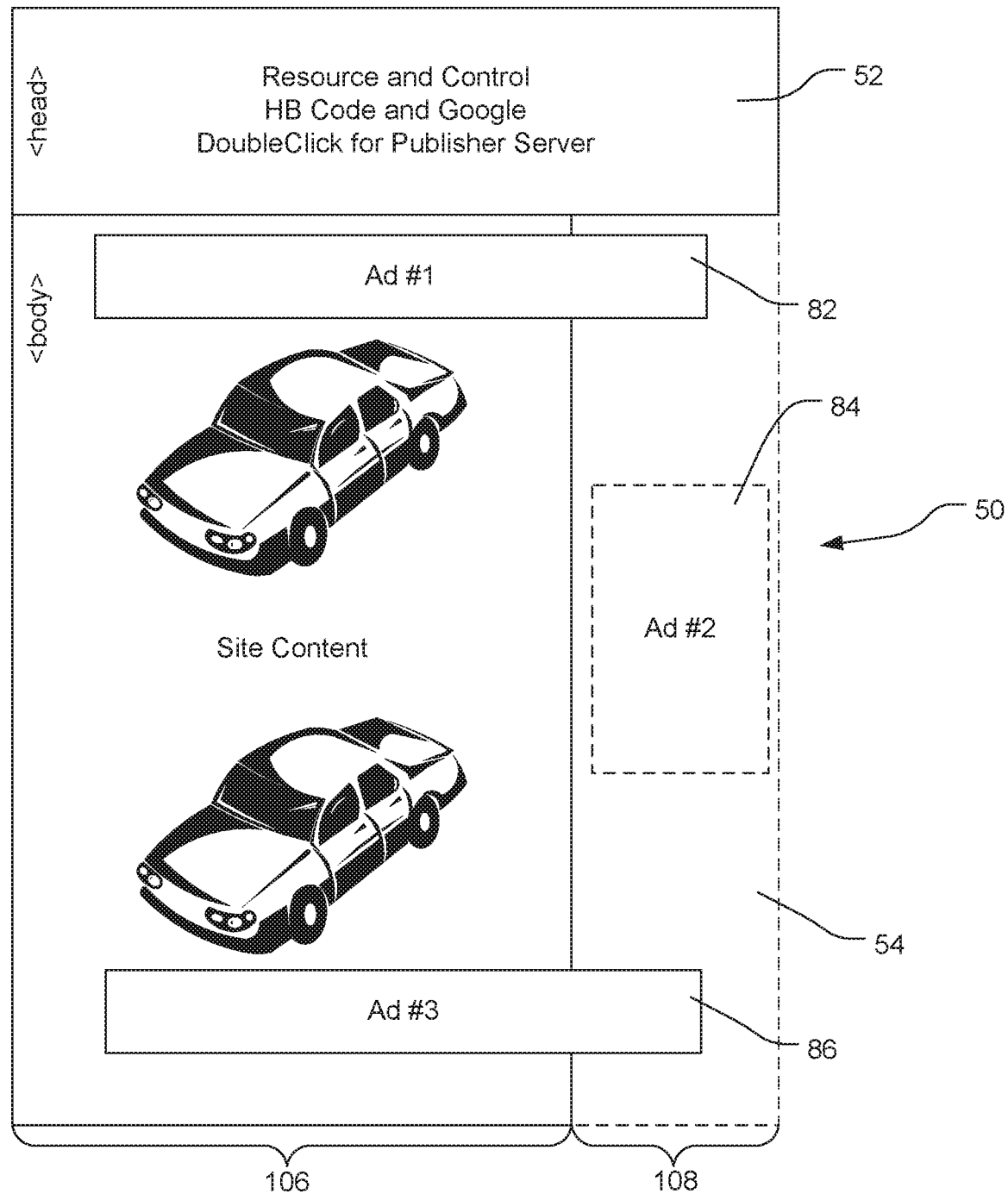
FIG. 10 shows a depiction of the webpage of FIG. 5 in which only a third portion of the webpage is visible within a visible content area of a browser window.

Examples of selective suspension of an advertisement refresh process are illustrated in FIGS. 8-10. In each of these Figures, the body 54 of the webpage 50, which is the portion normally visible to the user of the web browser is depicted as having a visible portion 106 (a portion of the body 54 falling within the visible content area 102) and a hidden portion 108 (a portion of the body 54 falling outside the visible content area 102 and thus requiring use of one or more of the scroll bars 104 to cause the hidden portion 108 to fall within the visible content area 102). Essentially any part of a webpage 50 may at times fall within the hidden portion 108, and the examples shown in FIGS. 8-10 are intended to be exemplary and not limiting of the manner in which all or portions of advertisements 56 may fall within the hidden portion 108 or the visible portion 106.

In the example of FIG. 8, the body 54 of the webpage 50 is taller than the visible content area 102, such that a bottom portion of the body 54 falls outside the visible content area 102 and thus forms the hidden portion 108. In this example, the first advertisement 82 and the second advertisement 84 fall within the visible portion 106, and accordingly the refresh process for these advertisements 56 continues as normal (unless the browser window 90 is minimized or switched to a different tab 100). In contrast, in this example, the third advertisement 86 falls entirely within the hidden portion 108 such that if the third advertisement 86 were refreshed the new third advertisement 86 might not ever be visible to, let alone be seen by, the user of the browser. Accordingly, in embodiments of the invention, the refresh process for the third advertisement 86 would be suspended until such time that a sufficient portion of the third advertisement 86 falls within the visible portion 106 (e.g., the user scrolls the webpage 50 down using one of the scroll bars 104 or otherwise). For example, in one embodiment, once the user scrolls down until at least 51% of the third advertisement 86 is visible, the refresh process for the third advertisement 86 would resume, and the third advertisement 86 could either be immediately refreshed or it could be refreshed after a resumed timing process reached a designated refresh time. For example, if the refresh process had been suspended with one minute and eight seconds remaining on a refresh timer, the third advertisement 86 could be refreshed one minute and eight seconds after it became at least 51% visible.

In the example of FIG. 9, the body 54 of the webpage 50 is again taller than the visible content area 102, such that a top portion of the body 54 falls outside the visible content area 102 and thus forms the hidden portion 108. In this example, the second advertisement 84 and the third advertisement 86 fall within the visible portion 106, and accordingly the refresh process for these advertisements 56 continues as normal (unless the browser window 90 is minimized or switched to a different tab 100). In contrast, in this example, the first advertisement 82 falls entirely within the hidden portion 108 such that if the first advertisement 82 were refreshed the new first advertisement 82 might not ever be visible to, let alone be seen by the user of the browser. Accordingly in embodiments of the invention, the refresh process for the first advertisement 82 would be suspended until such time that a sufficient portion of the first advertisement 82 falls within the visible portion 106, similar to the example of FIG. 8 discussed above.

In the example of FIG. 10, the body 54 of the webpage 50 is wider than the visible content area 102, such that a right portion of the body 54 falls outside the visible content area 102 and thus forms the hidden portion 108. In this example, major portions of the first advertisement 82 and the third advertisement 86 fall within the visible portion 106, and accordingly the refresh process for these advertisements 56 continues as normal (unless the browser window 90 is minimized or switched to a different tab 100). In contrast, in this example, the second advertisement 84 falls entirely within the hidden portion 108 such that if the second advertisement 84 were refreshed the new second advertisement 84 might not ever be visible to, let alone be seen by the user of the browser. Accordingly in embodiments of the invention, the refresh process for the second advertisement 84 would be suspended until such time that a sufficient portion of the second advertisement 84 falls within the visible portion 106, similar to the examples of FIGS. 8 and 9 discussed above.

Further variations are possible. For example, it is possible for the body 54 of the webpage 50 to be both taller and wider than the visible content area 102 of the browser window 90, such that the hidden portion 108 (or hidden portions 108) of the webpage 50 may extend along one or both sides as well as one or both of the top or bottom of the body 54. In such an example, it may be possible for advertisement refresh processes to be suspended for advertisements 56 with sufficient portions falling within multiple areas of the hidden portion 108 or hidden portions 108. As another example, if it had been determined that advertisements 56 would not refresh unless they are completely visible, then none of the advertisements 56 shown in FIG. 10 would be refreshed (at least pending resizing of the browser window 90, because portions of the first advertisement 82 and the third advertisement 86 fall within the hidden portion 108.

Accordingly, embodiments of the invention provide for selective refreshing of advertisements 56 as part of an improved header bidding process. The selective refreshing of advertisements 56 is based on visibility of the advertisements 56, such that advertisers bidding on advertising impressions can be assured that they are only bidding on advertising impressions that can result in being seen by consumers. Accordingly, publishers can maximize their revenue because of increased interest in the refreshed advertising placements.

The present invention may be embodied in other specific forms without departing from its spirit or essential characteristics. The described embodiments are to be considered in all respects only as illustrative and not restrictive. The scope of the invention is, therefore, indicated by the appended claims, rather than by the foregoing description. All changes which come within the meaning and range of equivalency of the claims are to be embraced within their scope.

What is claimed and desired to be secured by Letters Patent is:

1. A method for increasing webpage advertising revenue by ensuring that an advertising impression is visible on a webpage displayed on a browser before soliciting bids for a refreshed advertisement on the webpage, the method comprising:

providing the webpage with an advertisement therein, the webpage including information relating to a time period at which to refresh the advertisement with a new advertisement;

measuring a time that has passed since the webpage was provided;

before the time that has passed since the webpage was provided has equaled or exceeded the time period at which to refresh the advertisement, detecting that the advertisement is either not visible or is insufficiently visible on the browser providing the webpage;

suspending measurement of the time that has passed since the webpage was provided, such that the advertisement is not refreshed while the advertisement is either not visible or is insufficiently visible;

detecting that the advertisement is either visible or is sufficiently visible on the browser providing the webpage;

resuming measurement of the time that has passed since the webpage was provided;

determining that the time that has passed since the webpage was provided has equaled or exceeded the time period at which to refresh the advertisement;

refreshing the advertisement with the new advertisement, wherein refreshing the advertisement with the new advertisement comprises obtaining bids from an increased number of advertisers while maintaining low latency, comprising:

providing a first wrapper as part of a header of the webpage, the first wrapper containing information relating to obtaining bids from a first subset of advertisers for a first advertising impression for the webpage;

providing a second wrapper as part of the header of the webpage, the second wrapper containing information relating to obtaining bids from a second subset of advertisers for the first advertising impression for the webpage;

providing a third wrapper as part of the header of the webpage, the third wrapper containing information relating to obtaining bids from a third subset of advertisers for the first advertising impression for the webpage;

providing a control wrapper as part of the header of the webpage, the control wrapper controlling synchronization among the first wrapper, the second wrapper, and the third wrapper;

receiving a request to refresh the advertisement; and in response to the request to refresh the advertisement, using the information from the first wrapper, the second wrapper, and the third wrapper, with timing and synchronization controlled by the control wrapper, to simultaneously obtain bids for the first advertising impression for the webpage from the first subset of advertisers, the second subset of advertisers, and the third subset of advertisers.

2. The method as recited in claim 1, further comprising:

measuring a time that has passed since an original advertisement was refreshed with the new advertisement;

before the time that has passed since the original advertisement was refreshed with the new advertisement has equaled or exceeded the time period at which to refresh the advertisement, detecting that the new advertisement is either not visible or is insufficiently visible on the browser providing the webpage;

suspending measurement of the time that has passed since the original advertisement was refreshed with the new advertisement, such that the new advertisement is not refreshed while the new advertisement is either not visible or is insufficiently visible;

detecting that the new advertisement is either visible or is sufficiently visible on the browser providing the webpage;

resuming measurement of the time that has passed since the original advertisement was refreshed with the new advertisement;

determining that the time that has passed since the original advertisement was refreshed with the new advertisement has equaled or exceeded the time period at which to refresh the advertisement; and refreshing the new advertisement with another new advertisement.

3. The method as recited in claim 1, wherein detecting that the advertisement is either not visible or is insufficiently visible comprises detecting that a browser window displaying the webpage has been minimized or obscured.

4. The method as recited in claim 1, wherein detecting that the advertisement is either not visible or is insufficiently visible comprises detecting that a cutoff percentage of the advertisement falls outside of a visible content area of a browser window displaying the webpage, the cutoff percentage being a predetermined percentage selected within a range of ten percent to ninety percent.

5. The method as recited in claim 4, wherein measurement of the time that has passed since the webpage was provided is resumed when at least fifty-one percent of the advertisement falls within the visible content area.

6. The method as recited in claim 1, wherein the advertisement is a first advertisement of the webpage, wherein the webpage includes one or more additional advertisements, and wherein the method further comprises:

measuring the time that has passed since the webpage was provided for each of the one or more additional advertisements;

before the time that has passed since the webpage was provided for one of the one or more additional advertisements has equaled or exceeded the time period at which to refresh the advertisement, detecting that the one or more additional advertisements is either not visible or is insufficiently visible on the browser providing the webpage; and suspending measurement of the time that has passed since the webpage was provided with respect to the one or more additional advertisements, such that the one or more advertisement is not refreshed while the advertisement is either not visible or is insufficiently visible.

7. The method as recited in claim 6, wherein measurement of the time that has passed since the webpage was provided, suspension of measurement of the time that has passed since the webpage was provided, resumption of measurement of the time that has passed since the webpage was provided, and refreshing of the advertisement occurs independently for each advertisement of the webpage.

8. A method for increasing webpage advertising revenue by ensuring that advertising impressions are visible on a webpage displayed on a browser before soliciting bids for refreshed advertisements on the webpage, the method comprising:

providing the webpage with a plurality of advertisements therein, the webpage including information relating to one or more time periods at which to refresh the plurality of advertisements with new advertisements;

measuring a time that has passed since the webpage was provided;

before the time that has passed since the webpage was provided has equaled or exceeded the one or more time periods at which to refresh the advertisements, detecting that one or more of the plurality of advertisements is either not visible or is insufficiently visible on the browser providing the webpage;

suspending measurement of the time that has passed since the webpage was provided with respect to the one or more advertisements that is either not visible or is insufficiently visible, such that the one or more advertisements that is either not visible or is insufficiently visible is not refreshed while the one or more advertisements is either not visible or is insufficiently visible;

detecting that the one or more advertisements that was either not visible or was insufficiently visible is either visible or is sufficiently visible on the browser providing the webpage; and resuming measurement of the time that has passed since the webpage was provided with respect to the one or more advertisements;

determining that the time that has passed since the webpage was provided has equaled or exceeded one or more of the one or more time periods at which to refresh the one or more advertisements;

for each advertisement that has had its time period at which to refresh the one or more advertisements equaled or exceeded by the time that has passed since the webpage was provided, refreshing the advertisement with a new advertisement;

providing a first wrapper as part of a header of the webpage, the first wrapper containing information relating to obtaining bids from a first subset of advertisers for a first advertising impression for the webpage;

providing a second wrapper as part of the header of the webpage, the second wrapper containing information relating to obtaining bids from a second subset of advertisers for the first advertising impression for the webpage;

providing a third wrapper as part of the header of the webpage, the third wrapper containing information relating to obtaining bids from a third subset of advertisers for the first advertising impression for the webpage;

providing a control wrapper as part of the header of the webpage, the control wrapper controlling synchronization among the first wrapper, the second wrapper, and the third wrapper;

wherein refreshing the advertisement with the new advertisement comprises obtaining bids from an increased number of advertisers while maintaining low latency, comprising:

receiving a request to refresh the advertisement; and in response to the request to refresh the advertisement, using the information from the first wrapper, the second wrapper, and the third wrapper, with timing and synchronization controlled by the control wrapper, to simultaneously obtain bids for the first advertising impression for the webpage from the first subset of advertisers, the second subset of advertisers, and the third subset of advertisers.

9. The method as recited in claim 8, wherein detecting that one or more of the plurality of advertisements is either not visible or is insufficiently visible comprises either detecting that a browser window displaying the webpage has been minimized or obscured or detecting that a cutoff percentage of the advertisement falls outside of a visible content area of a browser window displaying the webpage, the cutoff percentage being a predetermined percentage selected within a range of ten percent to ninety percent.

10. A non-transitory computer-readable medium storing computer program code configured to cause a computing device to implement a method for increasing webpage advertising revenue by ensuring that an advertising impression is visible on a webpage displayed on a browser before soliciting bids for a refreshed advertisement on the webpage, the method comprising:

providing the webpage with an advertisement therein, the webpage including information relating to a time period at which to refresh the advertisement with a new advertisement;

measuring a time that has passed since the webpage was provided;

before the time that has passed since the webpage was provided has equaled or exceeded the time period at which to refresh the advertisement, detecting that the advertisement is either not visible or is insufficiently visible on the browser providing the webpage;

suspending measurement of the time that has passed since the webpage was provided, such that the advertisement is not refreshed while the advertisement is either not visible or is insufficiently visible;

detecting that the advertisement is either visible or is sufficiently visible on the browser providing the webpage;

resuming measurement of the time that has passed since the webpage was provided;

determining that the time that has passed since the webpage was provided has equaled or exceeded the time period at which to refresh the advertisement;

refreshing the advertisement with the new advertisement; wherein refreshing the advertisement with the new advertisement comprises obtaining bids from an increased number of advertisers while maintaining low latency, comprising:

providing a first wrapper as part of a header of the webpage, the first wrapper containing information relating to obtaining bids from a first subset of advertisers for a first advertising impression for the webpage;

providing a second wrapper as part of the header of the webpage, the second wrapper containing information relating to obtaining bids from a second subset of advertisers for the first advertising impression for the webpage;

providing a third wrapper as part of the header of the webpage, the third wrapper containing information relating to obtaining bids from a third subset of advertisers for the first advertising impression for the webpage;

providing a control wrapper as part of the header of the webpage, the control wrapper controlling synchronization among the first wrapper, the second wrapper, and the third wrapper;

receiving a request to refresh the advertisement; and in response to the request to refresh the advertisement, using the information from the first wrapper, the second wrapper, and the third wrapper, with timing and synchronization controlled by the control wrapper, to simultaneously obtain bids for the first advertising impression for the webpage from the first subset of advertisers, the second subset of advertisers, and the third subset of advertisers.

11. The non-transitory computer-readable medium as recited in claim 10, wherein the method further comprises:

measuring a time that has passed since an original advertisement was refreshed with the new advertisement;

before the time that has passed since the original advertisement was refreshed with the new advertisement has equaled or exceeded the time period at which to refresh the advertisement, detecting that the new advertisement is either not visible or is insufficiently visible on the browser providing the webpage;

suspending measurement of the time that has passed since the original advertisement was refreshed with the new advertisement, such that the new advertisement is not refreshed while the new advertisement is either not visible or is insufficiently visible;

detecting that the new advertisement is either visible or is sufficiently visible on the browser providing the webpage;

resuming measurement of the time that has passed since the original advertisement was refreshed with the new advertisement;

determining that the time that has passed since the original advertisement was refreshed with the new advertisement has equaled or exceeded the time period at which to refresh the advertisement; and refreshing the new advertisement with another new advertisement.

* * * * *